US010765123B2

(12) United States Patent
Hotte et al.

(10) Patent No.: US 10,765,123 B2
(45) Date of Patent: Sep. 8, 2020

(54) SYSTEM AND METHOD FOR PREPARING CRUSTACEAN BODY PARTS FOR MEAT EXTRACTION

(71) Applicant: Investissement Québec, Montréal (CA)

(72) Inventors: Denis Hotte, Québec (CA); François Bédard, Québec (CA); Richard Gagnon, Québec (CA); Olivier Marcotte, Québec (CA); Denis Lépine, Québec (CA); Alain Martel, Québec (CA)

(73) Assignee: Investissement Québec, Québec (CA)

( * ) Notice: Subject to any disclaimer, the term of this patent is extended or adjusted under 35 U.S.C. 154(b) by 0 days.

(21) Appl. No.: 15/995,857

(22) Filed: Jun. 1, 2018

(65) Prior Publication Data

US 2018/0360057 A1    Dec. 20, 2018

Related U.S. Application Data

(60) Provisional application No. 62/513,731, filed on Jun. 1, 2017.

(51) Int. Cl.
| | | |
|---|---|---|
| *A01K 29/00* | (2006.01) | |
| *A22C 29/02* | (2006.01) | |
| *B23K 26/359* | (2014.01) | |
| *A22C 17/00* | (2006.01) | |

(52) U.S. Cl.
CPC ........ *A22C 29/025* (2013.01); *A22C 17/0086* (2013.01); *B23K 26/359* (2015.10)

(58) Field of Classification Search
CPC ....... A22C 29/00; A22C 29/02; A22C 29/024; A22C 29/025

USPC .................................................. 452/1, 12, 13
See application file for complete search history.

(56) References Cited

U.S. PATENT DOCUMENTS

| 3,084,379 A | 4/1963 | Henning |
| 3,962,752 A * | 6/1976 | Cooke ............... A22C 29/00 452/8 |
| 4,021,886 A | 5/1977 | Crepeau |

(Continued)

FOREIGN PATENT DOCUMENTS

| EP | 2174552 A1 | 4/2010 |
| EP | 1994830 B1 | 6/2012 |

(Continued)

*Primary Examiner* — Richard T Price, Jr.
(74) *Attorney, Agent, or Firm* — Fasken Martineau Dumoulin LLP; Serge Lapointe

(57) ABSTRACT

A system and method for preparing a shelled crustacean body part for meat extraction are provided. The method involves capturing an image of said body part, evaluating the thickness of the shell from the image, determining from the thickness evaluation at least one laser parameter for forming a line of weakness within the shell, the line of weakness being dimensioned to facilitate meat extraction, while preserving the sensory characteristics of the meat, and sweeping a laser beam on the body part in accordance with the laser parameter to form the line of weakness within the shell. The method and system provide the advantage of facilitating meat extraction without compromising the quality or commercial value of the meat all while increasing productivity and performance in comparison with completely manual extraction techniques.

32 Claims, 23 Drawing Sheets

(56) References Cited

U.S. PATENT DOCUMENTS

| | | | | |
|---|---|---|---|---|
| 4,293,981 A | * | 10/1981 | Smith | A22C 29/023 452/1 |
| 4,337,552 A | | 7/1982 | Iwase | |
| 4,479,284 A | * | 10/1984 | Tolley | A22C 29/025 452/1 |
| 4,535,507 A | * | 8/1985 | Reinke | A22C 29/025 452/1 |
| 4,715,093 A | * | 12/1987 | Lapeyre | A22C 29/025 452/10 |
| 5,320,575 A | | 6/1994 | Fukamoto | |
| 5,364,301 A | | 11/1994 | Kestner et al. | |
| 5,542,877 A | * | 8/1996 | Taylor | A22C 9/00 452/1 |
| 5,580,303 A | * | 12/1996 | Winslow | A22C 29/02 452/1 |
| 6,086,468 A | * | 7/2000 | Yoshida | A22C 29/046 452/14 |
| 6,099,399 A | * | 8/2000 | Hearn | A22C 29/00 452/1 |
| 7,066,802 B1 | * | 6/2006 | Girton | A22C 29/024 452/1 |
| 2014/0187132 A1 | * | 7/2014 | Rau | A22C 29/022 452/3 |
| 2014/0248826 A1 | * | 9/2014 | Zhou | A22C 29/024 452/1 |
| 2016/0183542 A1 | * | 6/2016 | Fogarty | A22C 29/025 452/1 |

FOREIGN PATENT DOCUMENTS

| | | |
|---|---|---|
| EP | 2796049 A1 | 10/2014 |
| JP | 2251392 A | 10/1990 |
| JP | 3030356 U | 10/1996 |
| JP | 2005102527 A | 4/2005 |
| JP | 5489595 B2 | 5/2014 |
| KR | 101352724 B1 | 1/2014 |
| WO | 2016090387 A2 | 6/2016 |

* cited by examiner

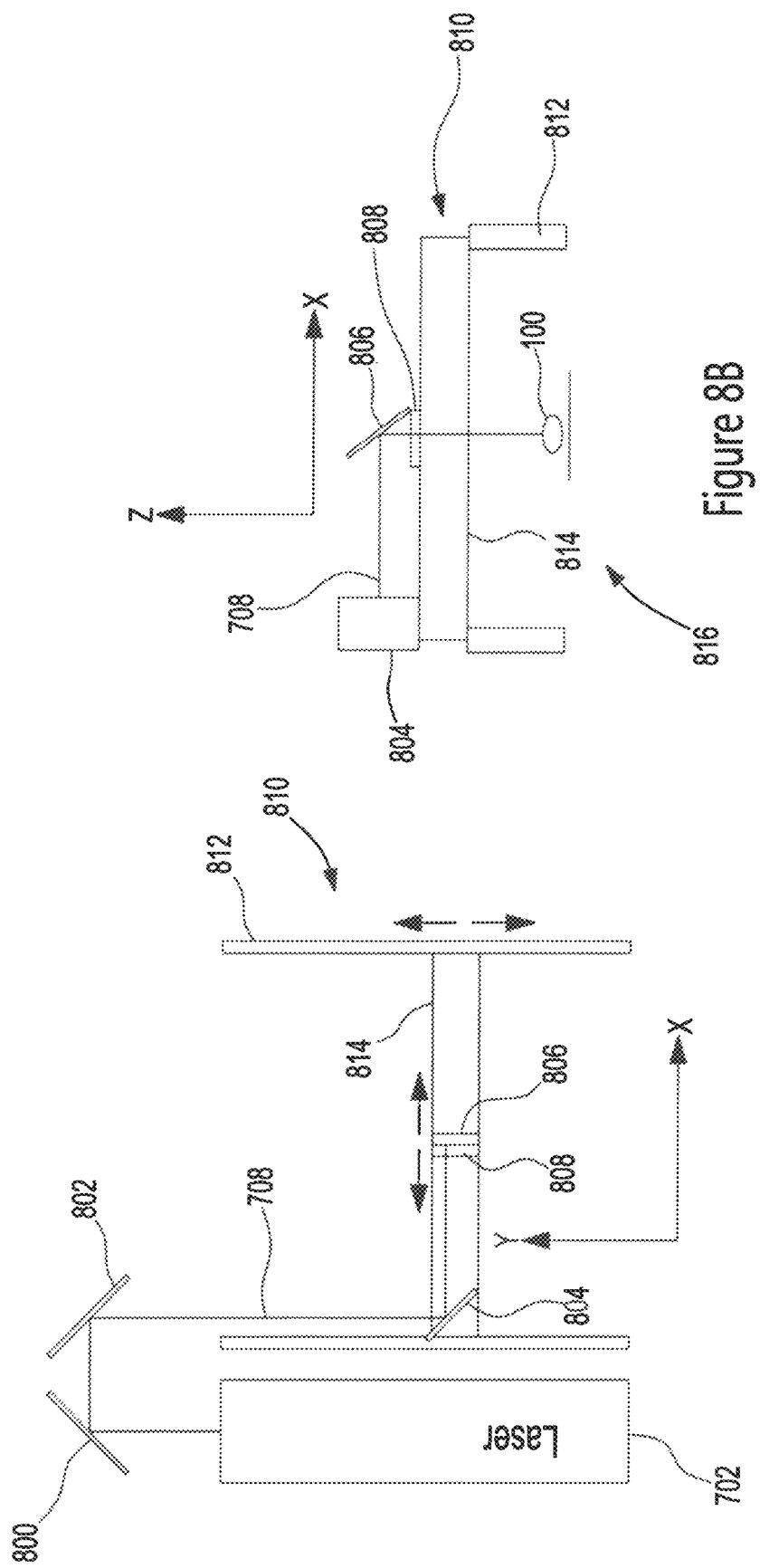

SYSTEM AND METHOD FOR PREPARING CRUSTACEAN BODY PARTS FOR MEAT EXTRACTION

TECHNICAL FIELD

The present invention relates to seafood processing tools, and more specifically, to systems and methods for enabling meat extraction from crustacean body parts.

BACKGROUND

Seafood processing plants employ a substantial number of workers to process crustaceans such as lobsters and crabs in peak periods. Their ability to meet the demands of their thriving market is threatened by the scarcity and aging of qualified labour. One of the tasks involved in the processing of crustaceans, the extraction of lobster arm meat, is particularly affected by labour issues; it is manual, repetitive, difficult, and performed at cold temperatures, and it can require up to fifty workers. Plants need a technological solution that provides for greater flexibility in workforce management while increasing productivity and improving the quality and value of crustacean meat products.

SUMMARY

It has been found that in a method of preparing a shelled crustacean body part for meat extraction, the steps of capturing an image of the body part, evaluating the thickness of the shell from the image, determining from the thickness evaluation at least one laser parameter for forming a line of weakness within the shell, the line of weakness being dimensioned to facilitate meat extraction, while preserving the sensory characteristics of the meat, and sweeping a laser beam on the body part in accordance with the laser parameter to form the line of weakness within the shell provide the advantage of facilitating meat extraction without compromising the quality or commercial value of the meat all while increasing productivity (body parts/minute) and performance (extracted meat weight/body part weight) in comparison with completely manual extraction techniques.

According to a first embodiment of the present invention, there is provided a method of preparing a shelled crustacean body part for meat extraction, the method comprising the steps of: capturing an image of the body part; evaluating the thickness of the shell from the image; determining from the thickness evaluation at least one laser parameter for forming a line of weakness within the shell, the line of weakness being dimensioned to facilitate meat extraction, while preserving the sensory characteristics of the meat; and sweeping a laser beam on the body part in accordance with the laser parameter to form the line of weakness within the shell.

It has been found that in a computer readable medium having stored thereon a software application to be executed by a controller of a system for preparing a shelled crustacean body part for meat extraction, the body part being carried along a displacement path by a transportation module, programming the software application such that when executed by the controller, it causes the controller's processor to perform the steps of: evaluating the thickness of the shell from an image of the body part; determining from the thickness evaluation at least one laser parameter for forming a line of weakness within the shell, the line of weakness being dimensioned to facilitate meat extraction, while preserving the sensory characteristics of the body part; and providing at least one of the system and transportation module with instructions to sweep the laser beam on the body part in accordance with the laser parameter to form the line of weakness within the shell provides the advantage of facilitating meat extraction without compromising the quality or commercial value of the meat all while increasing productivity and performance in comparison with completely manual extraction techniques.

According to a another embodiment of the present invention, there is provided a computer readable medium having stored thereon a software application to be executed by a controller of a system for preparing a shelled crustacean body part for meat extraction, the body part being carried along a displacement path by a transportation module, the software application, when executed by the controller, causes the controller's processor to perform the steps of: evaluating the thickness of the shell from an image of the body part; determining from the thickness evaluation at least one laser parameter for forming a line of weakness within the shell, the line of weakness being dimensioned to facilitate meat extraction, while preserving the sensory characteristics of the body part; and providing at least one of the system and transportation module with instructions to sweep the laser beam on the body part in accordance with the laser parameter to form the line of weakness within the shell It has been found that in a system for preparing a shelled crustacean body part for meat extraction, the body part being carried along a displacement path by a transportation module, the combination of an imaging unit configured to capture an image of the body part, a laser unit configured to project a laser beam on the body part downstream from the imaging unit, and a processor programmed to perform the steps of: evaluating the thickness of the shell from the image; determining from the thickness evaluation at least one laser parameter for forming a line of weakness within the shell, the line of weakness being dimensioned to facilitate meat extraction, while preserving the sensory characteristics of the meat; and providing instructions to at least one of the laser unit and the transportation module to sweep the laser beam on the body part in accordance with the laser parameter to form the line of weakness within the shell provides the advantage of facilitating meat extraction without compromising the quality or commercial value of the meat all while increasing productivity and performance in comparison with completely manual extraction techniques.

According to a another embodiment of the present invention, there is provided a system for preparing a shelled crustacean body part for meat extraction, the body part being carried along a displacement path by a transportation module, the system comprising an imaging unit configured to capture an image of the body part, a laser unit configured to project a laser beam on the body part downstream from the imaging unit, and a processor programmed to perform the steps of: evaluating the thickness of the shell from the image; determining from the thickness evaluation at least one laser parameter for forming a line of weakness within the shell, the line of weakness being dimensioned to facilitate meat extraction, while preserving the sensory characteristics of the meat; and providing instructions to at least one of the laser unit and the transportation module to sweep the laser beam on the body part in accordance with the laser parameter to form the line of weakness within the shell.

BRIEF DESCRIPTION OF THE DRAWINGS

The invention will be better understood by way of the following detailed description of embodiments of the invention with reference to the appended drawings, in which:

FIG. 8A is a schematic representation of a top plan view of another embodiment of the laser unit comprising a laser source and an X-Y displacement device;

FIG. 8B is a schematic representation of a side-elevation view of the embodiment of the laser unit shown in FIG. 8A;

DETAILED DESCRIPTION

The present invention relates to seafood processing tools, and more specifically, to systems and methods for processing shelled crustacean body parts. In order to extract meat from a crustacean body part, a cut is performed across the shell and the cut is widened to provide access to tools specifically designed to pressure the exposed meat out of the shell. The system and method of the present invention serve the purpose of preparing a crustacean body part for meat extraction by forming a line of weakness within its shell.

A line of weakness is a line along which the thickness of the shell is reduced in order to facilitate the opening of the shell in a manual or automated manner for the purposes of meat extraction. In one embodiment, the line of weakness is a shell-deep cut. In another embodiment, the line of weakness extends midway through the thickness of the shell. The line of weakness can have different orientations with respect to the body part. In one embodiment, it extends across the extremities of the body part. In another embodiment, it extends across the body part along an axis orthogonal to the one defined by the extremities. The line of weakness is not restricted to a specific length, but is of sufficient length to facilitate the opening of the shell, and by extension, meat extraction in a manual or automated manner.

Figure 1:
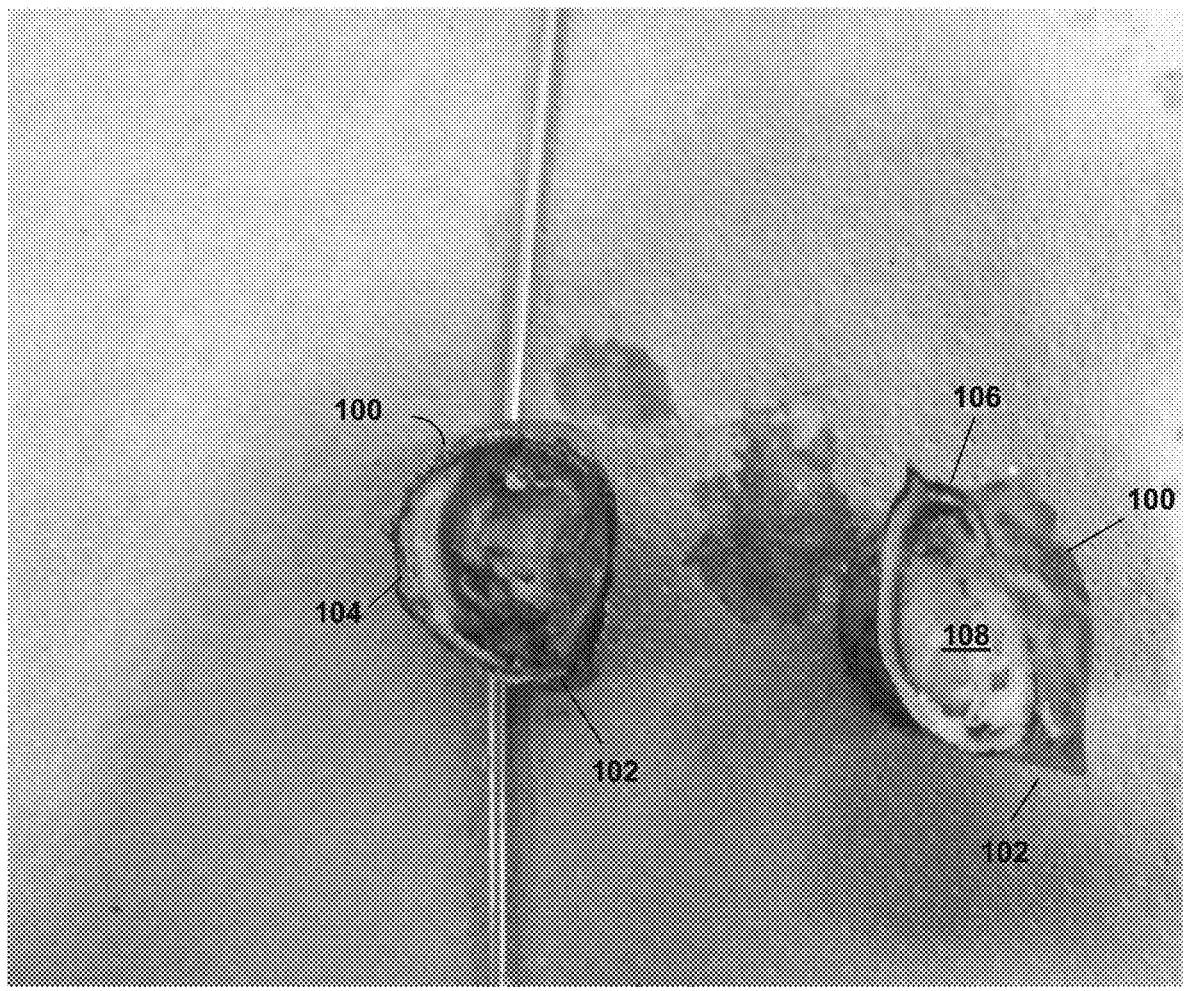
FIG. 1 is a photograph showing two cross-sections of a lobster arm.

The thickness of the shell varies among crustacean species, among members of a same species, and among types of body parts. In some species, it can even vary across different portions of a same body part, the portions being joined by an articulation, as clearly shown in FIG. 1. Upon close inspection of the cross sections of a crustacean body part 100 that consists in a lobster arm, a shell 102 appears to be two to three times thicker at position 104 than it is at position 106. For this reason, a line of weakness formed without accounting for the thickness of the shell can turn out to be too shallow to facilitate meat extraction or too deep to preserve the sensory characteristics of the meat 108, namely the appearance, odour, flavour, texture, and mouthfeel of the meat 108. The present invention overcomes this problem by adapting the formation of a line of weakness according to the thickness of the shell and provides the advantage of facilitating meat extraction without compromising the quality or commercial value of the meat all while increasing productivity and performance in comparison with completely manual extraction techniques. The following is a detailed description of various embodiments of the present invention in which lobster arms are used as exemplary body parts. It is nevertheless important to note the invention is designed to accommodate other types of shelled crustacean body part.

Figure 2:
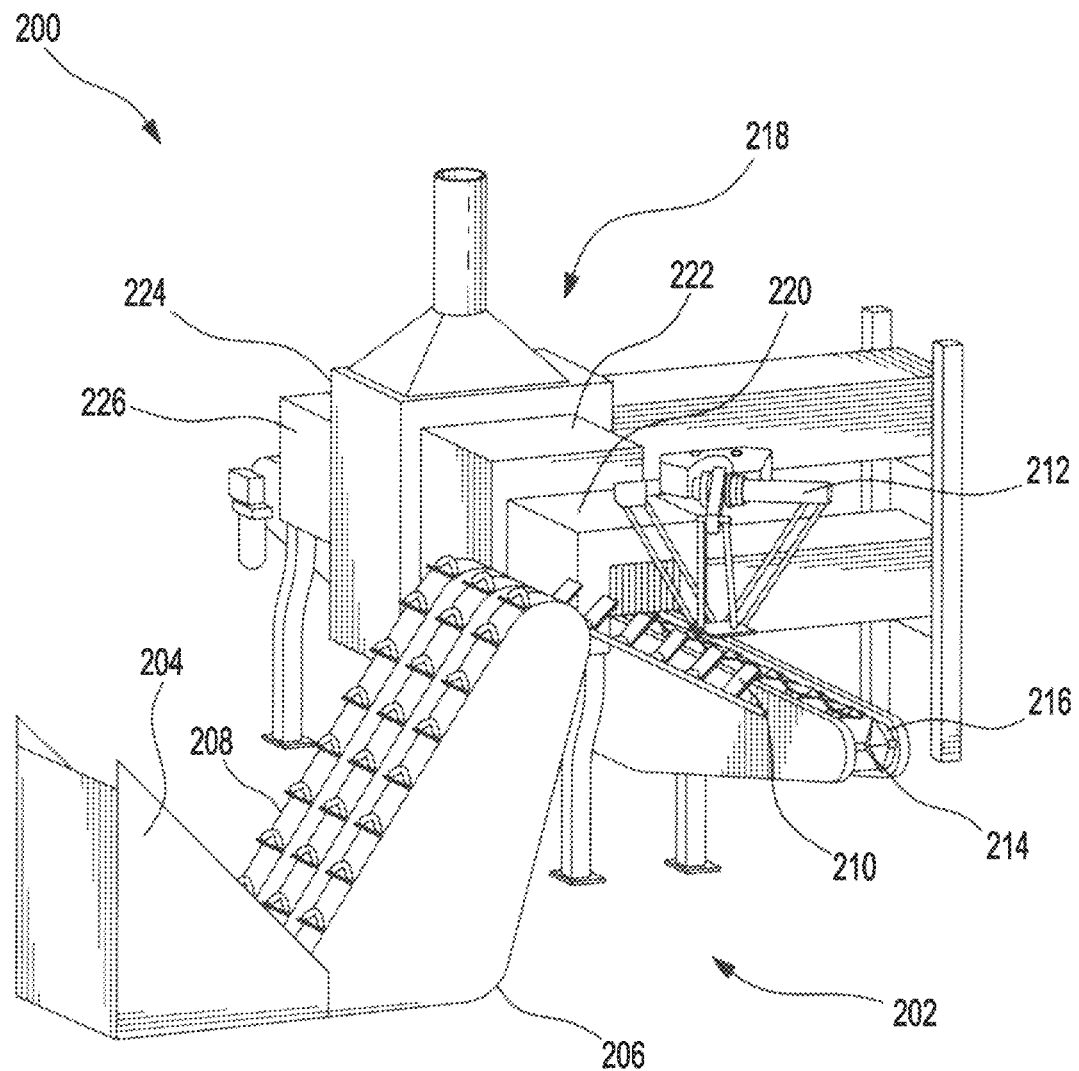
FIG. 2 is a schematic representation of a top perspective view of facility for preparing shelled crustacean body parts for meat extraction according to an embodiment of the invention.

FIG. 2 illustrates a facility 200 for processing shelled crustacean body parts. The facility 200 has an automatic loading station 202, a transportation module 216 in the form of a conveyor, and a body part preparation system 218. The loading station 202 is configured for detangling and loading the body parts onto the transportation module 216 on an individual basis. In turn, the transportation module 216 carries the body parts along a displacement path through the stations of the preparation system 218.

The automatic loading station 202 has a trough 204, an unscrambler 206, an optical device (not shown), and an automatic gripper 212. The trough 204 is configured to receive batches of body parts for processing. The unscrambler 206 physically communicates with the through 204 to lift the body parts and separate them from one another in order to make them individually accessible for loading. The optical device is positioned to capture images at the downstream end of the unscrambler 206 for the purpose of verifying whether the pre-loading position of each body part is conducive to a transfer into a desired position on the transportation module 216, the desired position being particularly appropriate for the purposes of the preparation system 218. The automatic gripper 212 is configured to carry out the transfer in question, making adjustments along the way if the pre-loading position is found to be improper.

The unscrambler 206 has a dispenser 208 and a separator 210. The dispenser 208 is provided with three rails of cleats, each of one of which is adapted to lift a body part from the trough 204 for transfer onto the separator 210. Once in the separator 210, the body parts engage a different set of cleats adapted to make each body part individually available for loading onto the transportation module 216, and more specifically, for loading onto a distinct support element 214 mounted on the transportation module 216.

Figure 3:
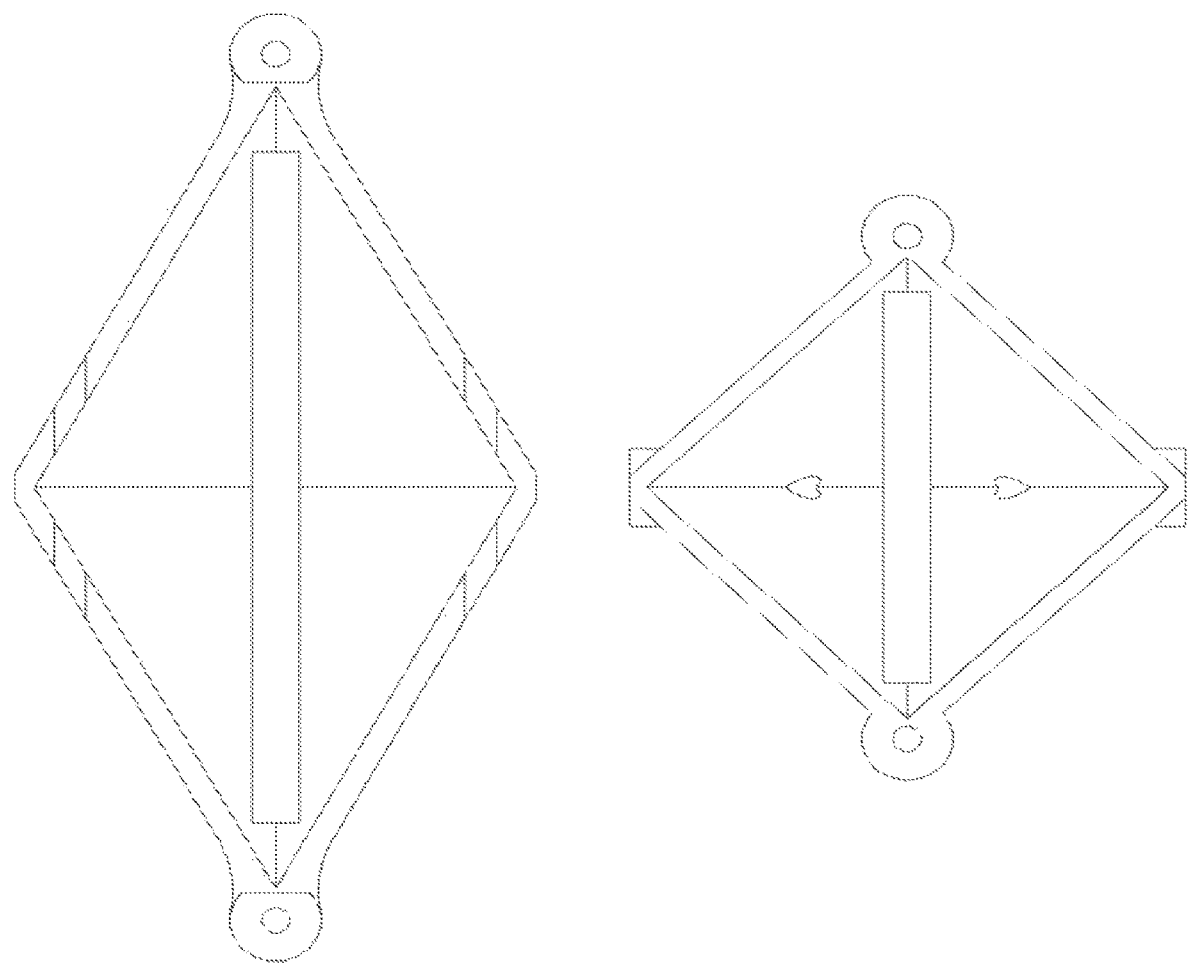
FIG. 3 is a photograph showing examples of support elements that can be integrated into the facility illustrated in FIG. 2.

Referring now to FIG. 3, there is shown a photograph of two embodiments of the support element 214, both of which consist in support trays that can be mounted on the transportation module 216. The support element 214 defines a diamond-shaped aperture for receiving the body part and for exposing its topside to a sweeping laser beam. It has a crossed V-shape to align the body part in an optimal position for imaging and laser cutting as it travels through the preparation system 218, all while providing adequate support for its convex shape. It also defines an elongate aperture 300 exposing the underside of the body part to a sweeping laser beam. The support element 214 is made from aluminum by 3D printing. As shown in FIG. 2, multiple ones of the support element 214 can be mounted on the transportation module 216 as linked to one another to form a continuous chain. While the support element 214 has been described as a support tray, it can be any other structural element configured to maintain a body part in an appropriate position for the purposes of the preparation system 218. For instance, the support element 214 can alternatively consist in clamps configured to secure the body part onto the transportation module 216. Furthermore, while the support element 214 has been described as being made from aluminum, it can be made from any other material suitable for food processing such as stainless steel and food-grade polymers.

Figure 21:
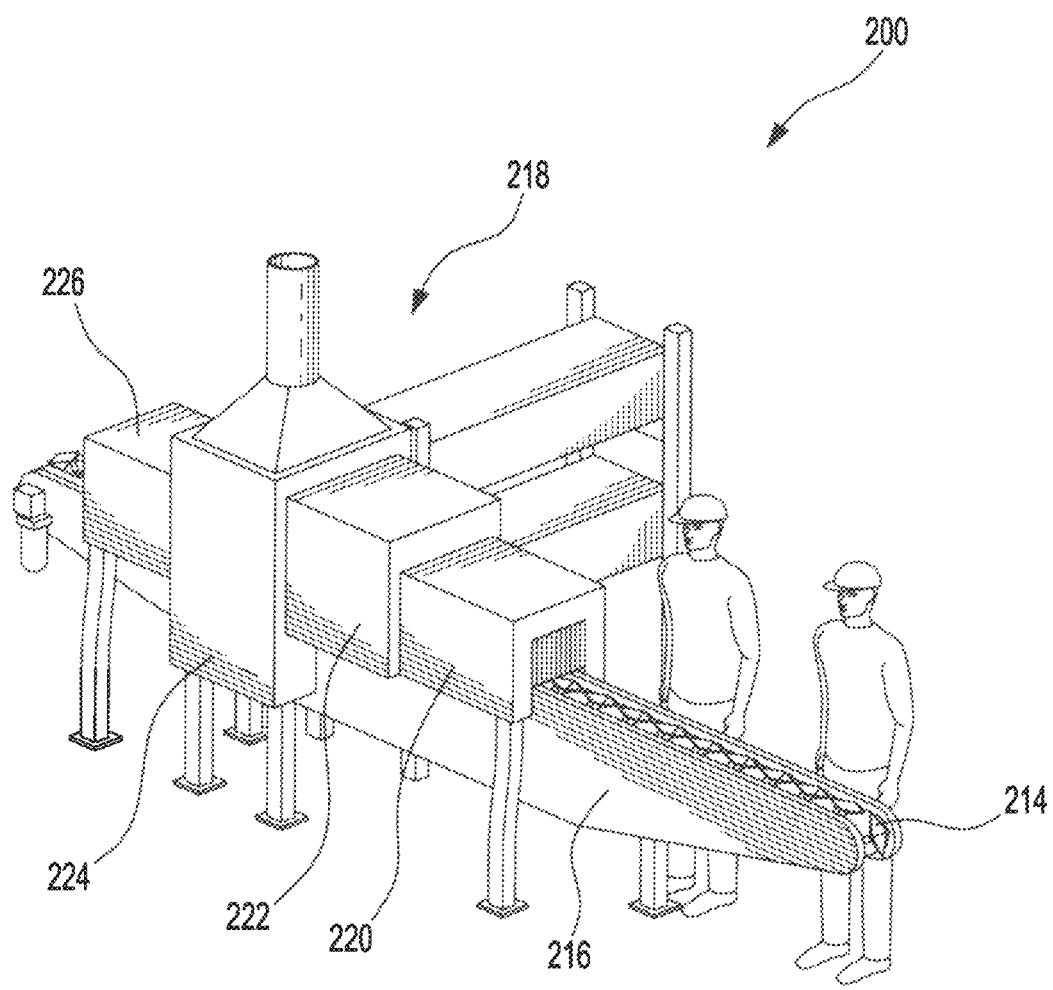
FIG. 21 is a schematic representation of a top perspective view of the facility for preparing shelled crustacean body parts for meat extraction according to another embodiment.

Before delving into a description of the remaining components of the facility 200, it is important to note that although the loading of the body parts 100 onto the transportation module 216 has been described as involving the loading station 202, it can alternatively be carried out by workers positioned upstream from the preparation system 218 as shown in the schematic diagram of FIG. 21.

Referring back to FIG. 2, the preparation system 218 has a laser safety enclosure 220, an imaging station 222, a laser station 224, a shell opening station 226, and a system controller (not shown) that cooperate with one another to form a line of weakness within the shell and open the shell along the line of weakness to facilitate meat extraction. The laser safety enclosure 220 defines a protection zone confining the laser light to the inside of the preparation system 218.

Figure 5:
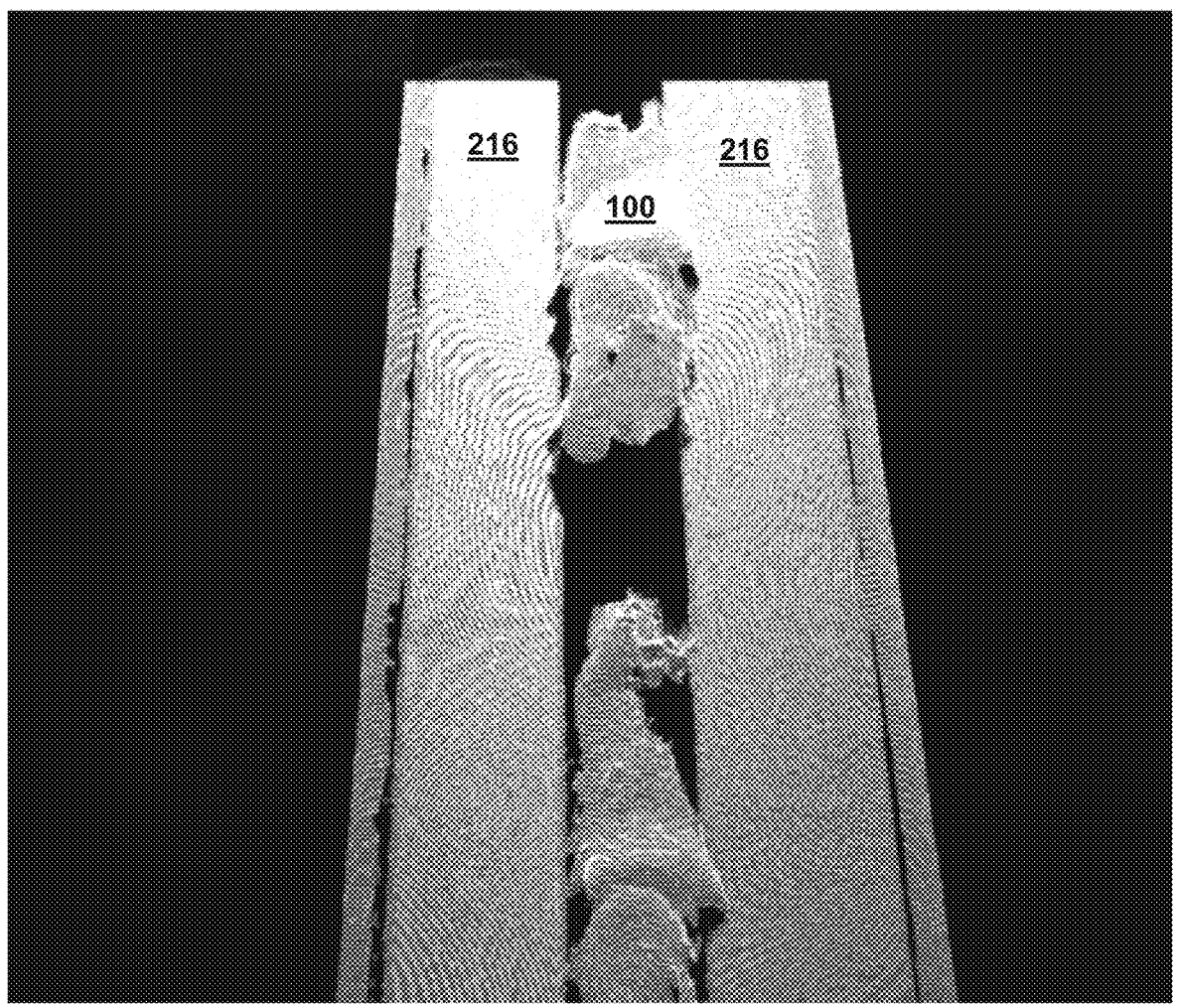
FIG. 5 is an example of a three-dimensional profile image of a lobster arm generated by a three-dimensional scanner.

Downstream from the laser safety enclosure 220 is the imaging station 222, which comprises an imaging unit configured to capture an image of the body part. In one embodiment, the imaging unit is a three-dimensional scanner configured to sweep the surface of the body part positioned within its field of view to form a laser line transversal to the movement of the transportation module 216 so as to generate a three-dimensional profile image such as the one shown in FIG. 5. The three-dimensional scanner can, for instance, take the form of a three-dimensional profilometer such as the one described in U.S. Pat. No. 7,422,999 issued in the name of the applicant, the content of which patent is incorporated herein by reference. It will be appreciated that the imaging unit can alternatively be another type of device configured to capture two- or three-dimensional images of body parts, the images being of sufficient resolution for the purposes of the system controller.

The system controller is in communication with the imaging station 222, the shell opening station 226, and at least one of the laser station 224 and the transportation module 216. The system controller is configured to process the image captured by the imaging unit in order to locate the articulations of the body part, each articulation joining distinct portions of the body part, to evaluate the thickness of the shell covering each one of the portions, to determine from the thickness evaluation at least one laser parameter for forming a line of weakness within the shell, the line of weakness being dimensioned to facilitate meat extraction, while preserving the sensory characteristics of the meat, and to provide instructions to at least one of the laser station 224 and the transportation module 216 for the purpose of causing a laser beam sweep on the body part in accordance with the laser parameter so as to form the line of weakness within the shell. Optionally, the laser station 224 is also configured to determine a laser path along which the line of weakness is to be formed and to provide the laser path to at least one of the laser station 224 and the transportation module 216 as incorporated within the instructions. Optionally, the laser station 224 is also configured to determine at least one pressure parameter for opening the shell along the line of weakness and to provide the shell opening station 226 with instructions to exert pressure on the body part in accordance with the pressure parameter.

Figure 7:
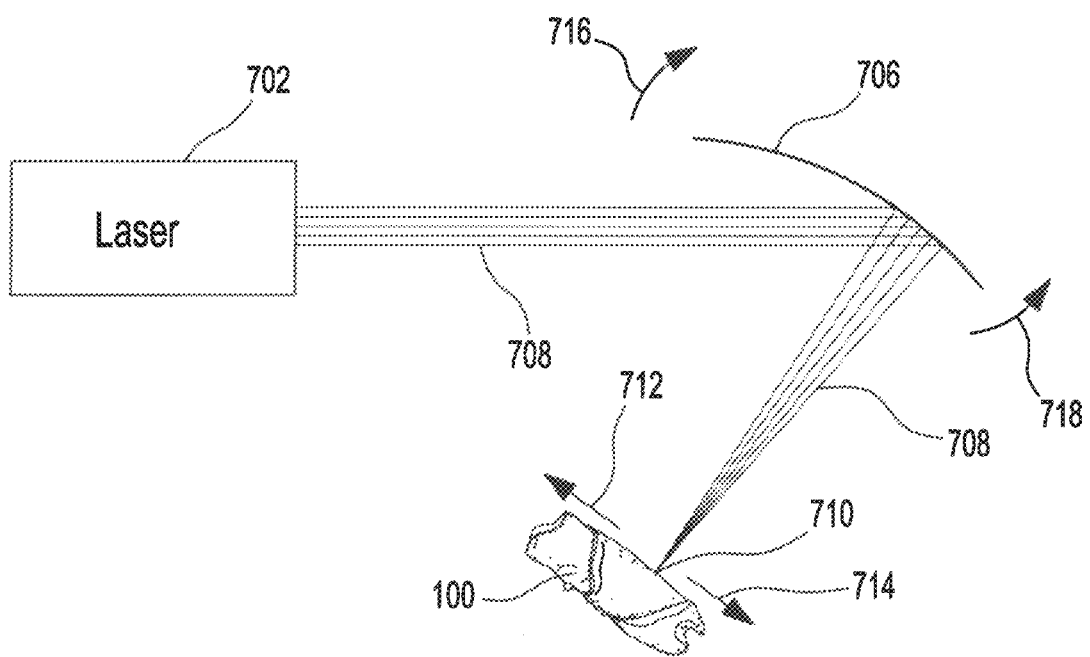
FIG. 7 is a schematic representation of an embodiment of a laser unit comprising a laser source and a 2D beam-steering device.

Downstream from the imaging station 222 is the laser station 224, which is configured to project a laser beam onto the body part. The laser station 224 has a laser unit, an embodiment of which is shown in FIG. 7. The laser unit has a pulsed or continuous $CO_2$ laser source 702 and a two-dimensional beam-steering device. The laser source 702, which can be the one provided by Laserax (Québec, Canada), is mounted in a fixed position with respect to a space intended to receive the body part 100. As for the beam-steering device, it has at least one adjustable mirror 706 configured to receive and sweep the laser beam 708 on the body part in one of the directions indicated by arrows 710 and 712, the laser beam 708. The sweeping motion is caused by the controlled pivot of the mirror 706 in a corresponding one of the directions indicated by arrows 716 and 718. It will be appreciated that another mirror can be configured to enable a sweeping motion across a plane orthogonal to the directions 710 and 712 for the purposes of accommodating orientations of the body part 100 different from the one shown in FIG. 7. Even though it would be preferable to maintain a focal point 710 of the laser beam 708 at a minimal distance from the body part, trials have shown that distance variations have no significant influence on the quality of the cut when a low-divergence laser is deployed.

Figure 6:
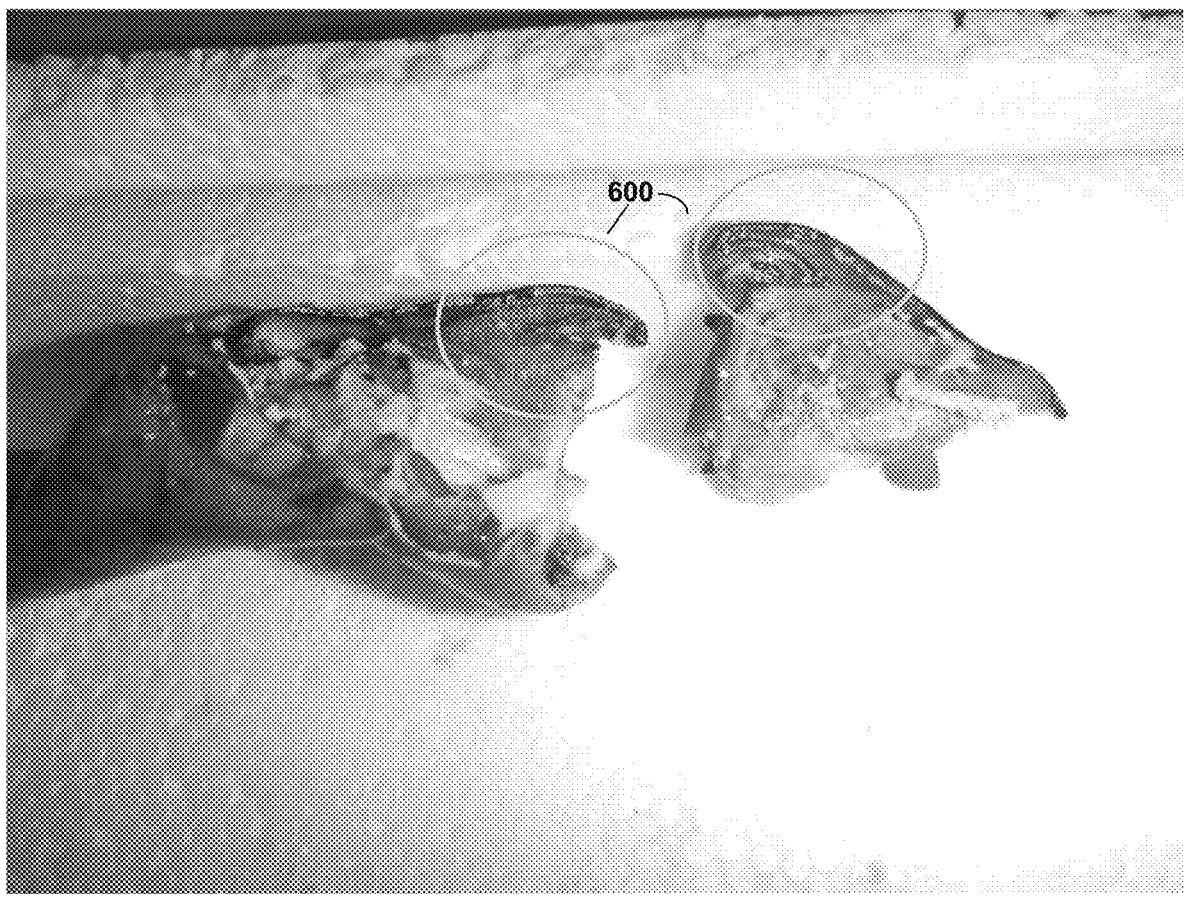
FIG. 6 is a photograph of a lobster arm cross section showing double-layered shell extremities
Figure 9A:
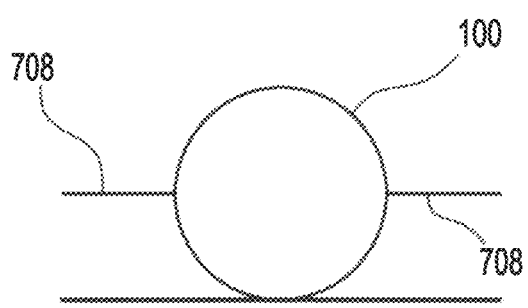
FIG. 9A is a schematic representation of a setup for forming a line of weakness within a body part shell along an orthogonal axis.
Figure 9B:
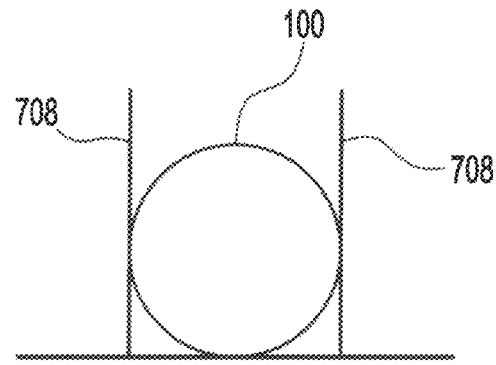
FIG. 9B is a schematic representation of a setup for forming a line of weakness within a body part shell along a tangential axis.
Figure 10:
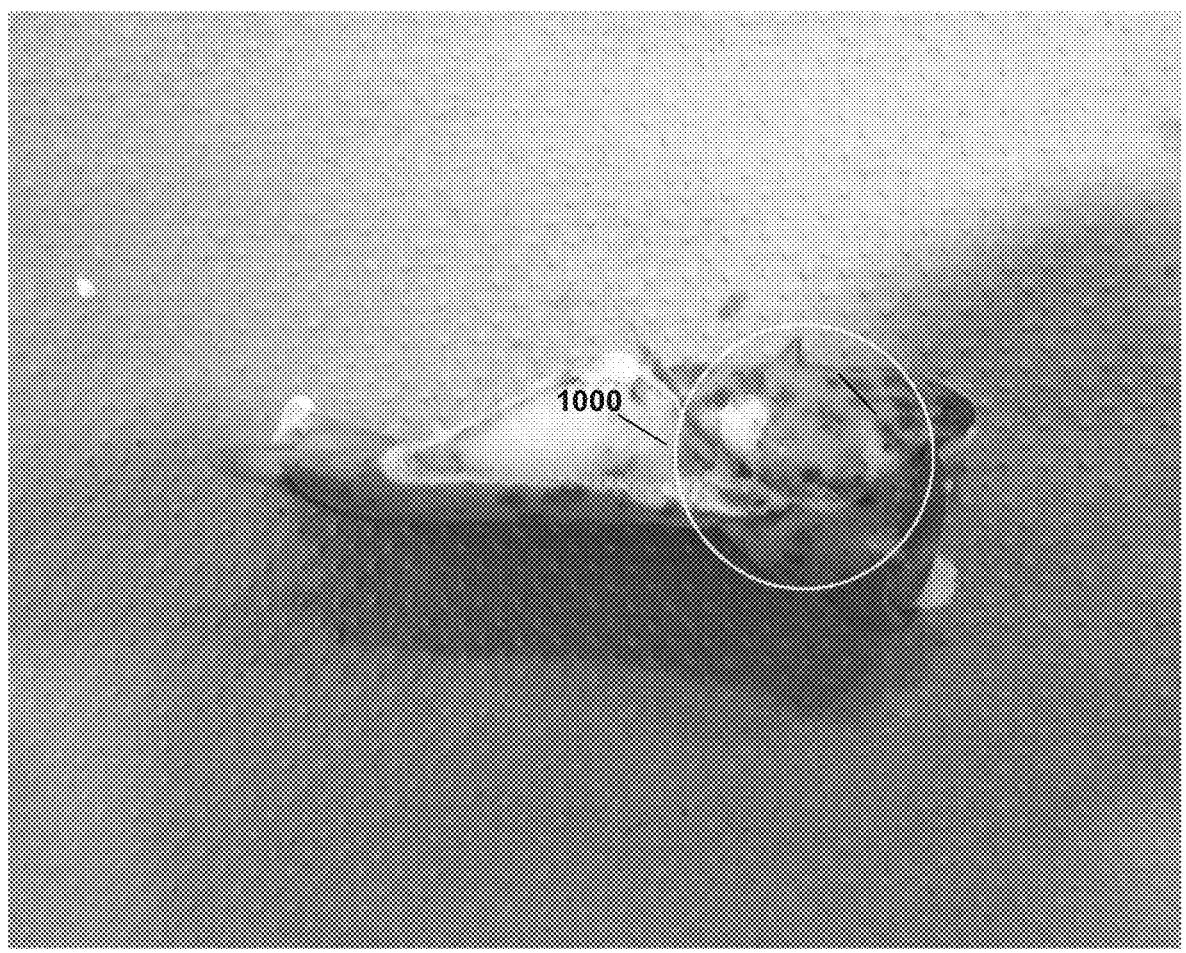
FIG. 10 is a photograph of a lobster arm cut along a tangential axis.

Referring now to FIG. 9A and FIG. 9B, the laser beam 708 can be oriented in different ways with respect to the body part 100. For instance, FIG. 9A illustrates an orthogonal orientation with respect to the body part 100 whereas FIG. 9B illustrates a tangential orientation. Trials on lobster arms have shown the orthogonal orientation to provide for deeper cuts than the tangential orientation. This distinction is particularly apparent in the photograph of FIG. 6, which shows a lobster arm that has been subjected to tangential laser beams; the circled shell portions, which are thicker, have remained uncut. In some embodiments, the orientation of the laser beam is one of the laser parameters determined by the system controller from the thickness evaluation. For instance, the orthogonal orientation can be determined as more appropriate for a thicker shell. The number of times the laser beam is to be swept is another example of a laser parameter, one that is described in further detail in the following paragraph.

Figure 4:
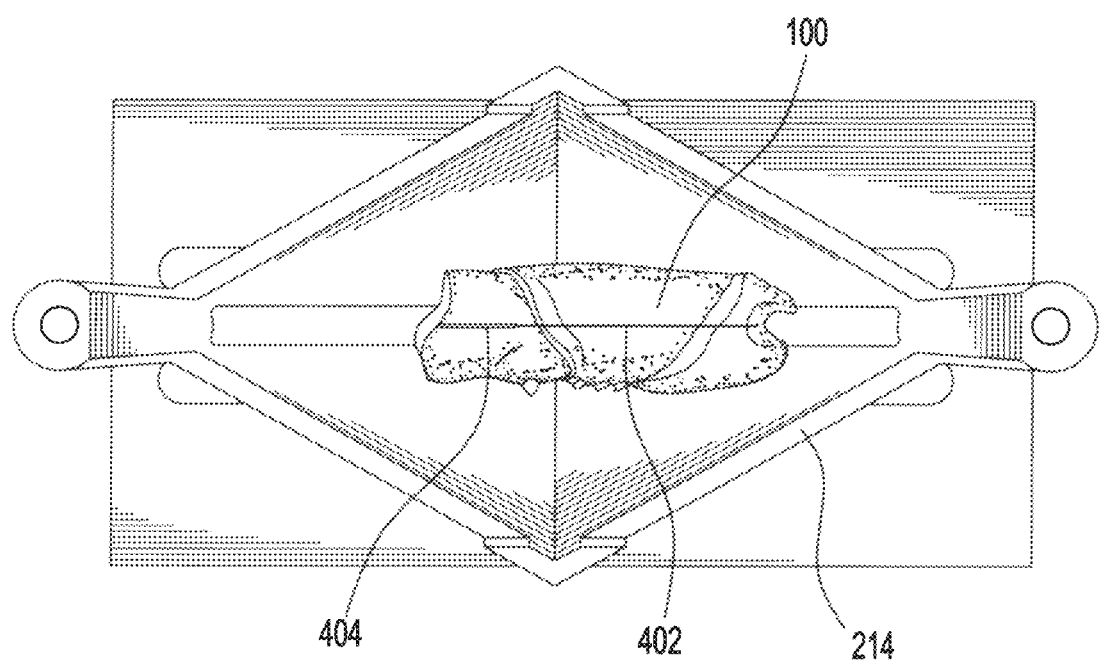
FIG. 4 is a schematic representation of a top plan view of a lobster arm disposed in a support element and on which are indicated single-sweep and multiple-sweep laser paths over distinct arm portions.

The system controller can provide at least one of the laser station 224 and the transportation module 216 with instructions causing a greater number of laser beam sweeps over thicker portions of a body part. For instance, in FIG. 4, there are shown a first laser path 402 overlapping a thinner portion of the body part 100 and a second laser path 404 overlapping a thicker portion. Upon evaluating the thickness of the body part 100, the system controller can, in one embodiment, determine that the thinner portion cannot withstand more than one laser beam sweep over the first laser path 402 whereas the thicker portion warrants two laser beam sweeps over the second laser path 404. It is important to note that while the laser paths 402 and 404 are shown as aligned, they can alternatively be misaligned and the resulting line of weakness is composed of two misaligned line segments. Another example of a laser parameter is the speed at which the laser beam is swept, a parameter described in further detail in the following paragraph.

The system controller can provide at least one of the laser station 224 and the transportation module 216 with instructions to cause a laser beam sweep on the body part at a specific speed. For instance, if the laser station 224 cannot perform more than one laser beam over each portion of the body part, the system controller can be programmed to determine that the laser beam is to be swept at lower speeds on portions of the body part characterized by a thicker shell. Conversely, if the laser station 224 is capable of multiple laser beam sweeps on each portion of a body part, the number and speed of the laser beam sweeps can be determined in combination for greater precision. For instance, a portion characterized by a shell of medium thickness can subjected to a greater number of laser beam sweeps than another characterized by a thinner shell, but the speed of the laser beam sweeps can be adjusted to attenuate their individual effect on the shell.

Referring now to FIG. 8A and FIG. 8B, there are shown schematic diagrams of another embodiment of the laser unit. The laser source 702 is mounted in a fixed position with respect to a space 816 intended to receive the body part 100 as shown in FIG. 8B. Mirrors 800, 802, and 804 direct the laser beam 708 towards the receiving end of an optical deflector mounted on a movable head 808 of a displacement device such as an X-Y table 810 using orthogonal rails 812 and 814. The optical deflector has a mirror 806 positioned to enable a redirection of the laser beam 708 towards the space 816. The controlled displacement of the moveable head 808 causes a corresponding displacement of the laser beam 708 along a laser path that extends across the shell of the body part 100.

In another embodiment, the laser source 702 is mounted in a fixed position above the transportation module 216, which incorporates a displacement device such as an X-Y table provided with a moveable head on which is mounted a receptacle for receiving the body part 100. The displacement device causes a relative displacement of the receptacle with respect to the fixed laser source 702 so as to sweep the laser beam 708 along a path extending across the surface of the body part 100.

In yet another embodiment, the laser source 702 can be used in combination with a two-dimensional beam-steering device. The laser source 702 is secured in a fixed position with respect to the transportation module 2016, which is in the form of a linear conveyor and on which is mounted the support element 214 for receiving the body part 100. The respective displacements of the laser beam 708 and transportation module 216 causes a sweeping motion of the laser beam 708 across the shell surface of the lobster arm 100. It will be appreciated that the aforementioned embodiments of the laser unit are merely provided for exemplary purposes.

A series of seven trials were conducted using a laser unit incorporating a 250 W continuous laser source and a two-dimensional beam-steering device on lobster arms. The results of these trials are presented in the following paragraphs.

In Trial 1, the laser beam was oriented orthogonally with respect to the lobster arm and was swept at speeds of 1000 mm/s, 500 mm/s, and 50 mm/s. The first two speeds produced an incomplete cut within the shell whereas the third speed produced a cut extending beyond the thickness of the shell and burned the meat.

In Trial 2, the laser beam was oriented tangentially with respect to the lobster arm and was swept at a speed of 20 mm/s. Several sweeps were required to produce a complete cut, which cause the meat to burn.

In Trial 3, the laser beam was oriented orthogonally with respect to the lobster arm and was swept at speeds of 100 mm/s, 130 mm/s, and 140 mm/s. The first two speeds produced a cut extending beyond the thickness of the shell.

In Trial 4, the focal point of the laser beam was brought in further proximity to the portion of the lobster arm characterized by a thicker shell. The adjustment of the position of the focal point as a function of shell thickness had no incidence on the quality of the process. It was concluded that by using a low-divergence laser source, no such adjustment is necessary.

In Trial 5, the laser beam was swept in segmented fashion across the portions of the lobster arm using three combinations of speeds. More specifically, the laser beam was swept: at a speed of 20 mm/s on portions characterized by thicker shells and at a speed of 60 mm/s on other portions; at a speed of 50 mm/s on portions characterized by thicker shells and at a speed of 140 mm/s on other portions; and at a speed of 60 mm/s on portions characterized by thicker shells and at a speed of 1800 mm/s on other portions. The three combinations of speed produced adequate results for those of the portions characterized by a thinner shell, but burned the meat residing in the other portions.

In Trial 6, the laser beam was swept in segmented fashion across the portions of the lobster arm. More specifically, the laser beam was swept: once at a speed of 60 mm/s on portions characterized by thicker shells and once at a speed of 180 mm/s on other portions; and three times at a speed of 180 mm/s on portions characterized by thicker shells and three times at a speed of 180 mm/s on other portions. Both sets of laser parameters produced adequate results.

A seventh trial was conducted using a different embodiment of the laser unit, one incorporating a 250 W laser source mounted on an X-Y table alongside an air blower. In Trial 7, the laser beam was oriented orthogonally with respect to the lobster arm and was swept at speeds of 200 mm/s, 400 mm/s, and 500 mm/s. This particular embodiment produced a slightly thinner cut within the shell in comparison with the cut produced by the embodiment used in Trials 1-6, but both produce substantially similar results. It was also discovered that operation of the air blower effectively reduces the burnt odor that would have been otherwise imparted to the lobster arm. Alternatively, the rinsing of the meat in water substantially eliminates the odor in question. Tasting experiments conducted by a jury revealed no notable burnt taste.

The results of Trials 1-7 have demonstrated that by determining the laser parameters as a function of shell thickness, a line of weakness can be formed within the shell to facilitate meat extraction while preserving the sensory characteristics of the meat. Furthermore, three performance trials were conducted using lobster arms prepared in accordance with the present invention to assess repercussions on meat extraction.

Figure 19:
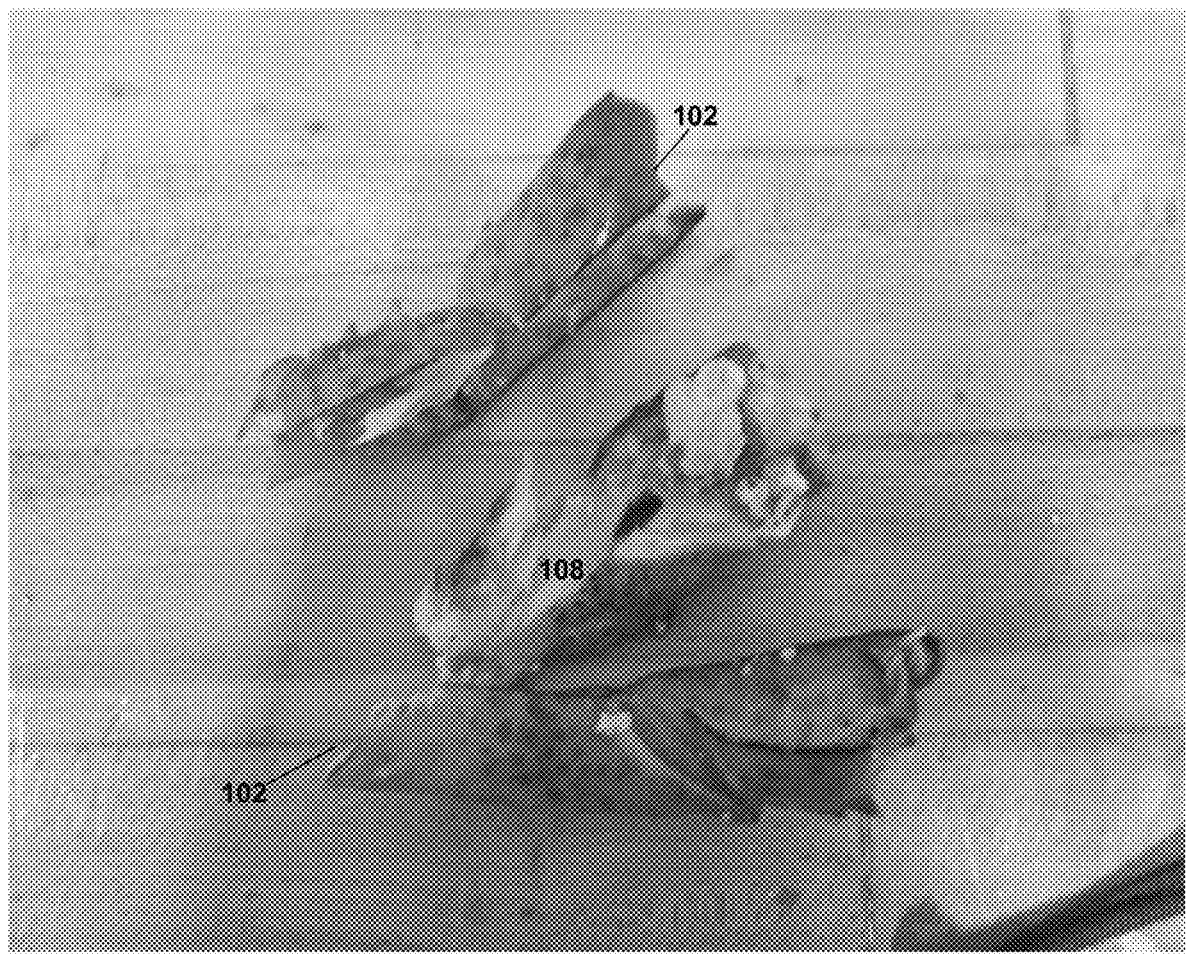
FIG. 19 is a photograph of a lobster arm that has been prepared according to the method of the present invention and from which meat has been extracted.

In each one of the three performance trials, the meat residing in the lobster arm was extracted in the form of a single piece with marginal waste. One of the extracted pieces is shown in the photograph of FIG. 19. The results of these performance trials have demonstrated that the present invention provides for complete extraction of meat in the form of a single piece and is therefore particularly advantageous over entirely manual techniques as the latter are known to yield fragmented or shredded meat of lesser commercial value and are more vulnerable to contamination.

Before delving into a description of the shell opening station 226, it is important to note that while the foregoing trials were conducted using a continuous $CO_2$ laser source, the laser unit can alternatively incorporate a pulsed $CO_2$ laser source, which requires less power. It is also important to note that while in some embodiments, the laser beam sweeps are exclusively performed over one side of the body part, in others, they are performed on opposite sides of the body part, such as the topside and the underside, to further facilitate meat extraction. In one embodiment, the laser station 224 has two laser units configured to perform laser beam sweeps on opposite sides of the body part. In another embodiment, the laser station 224 has one laser unit moveable around the displacement path in order to perform the laser beam sweeps on opposite sides of the body part.

Downstream from the laser station 224 is the shell opening station 226, which incorporates a shell opener configured to exert pressure onto the body part in accordance with the pressure parameter determined by the system controller so as to open the shell along the line of weakness in order to further facilitate meat extraction. In the following, multiple embodiments of the shell opener are described. Nevertheless, it will be appreciated that other embodiments of the shell opener can be used instead.

Figure 11:
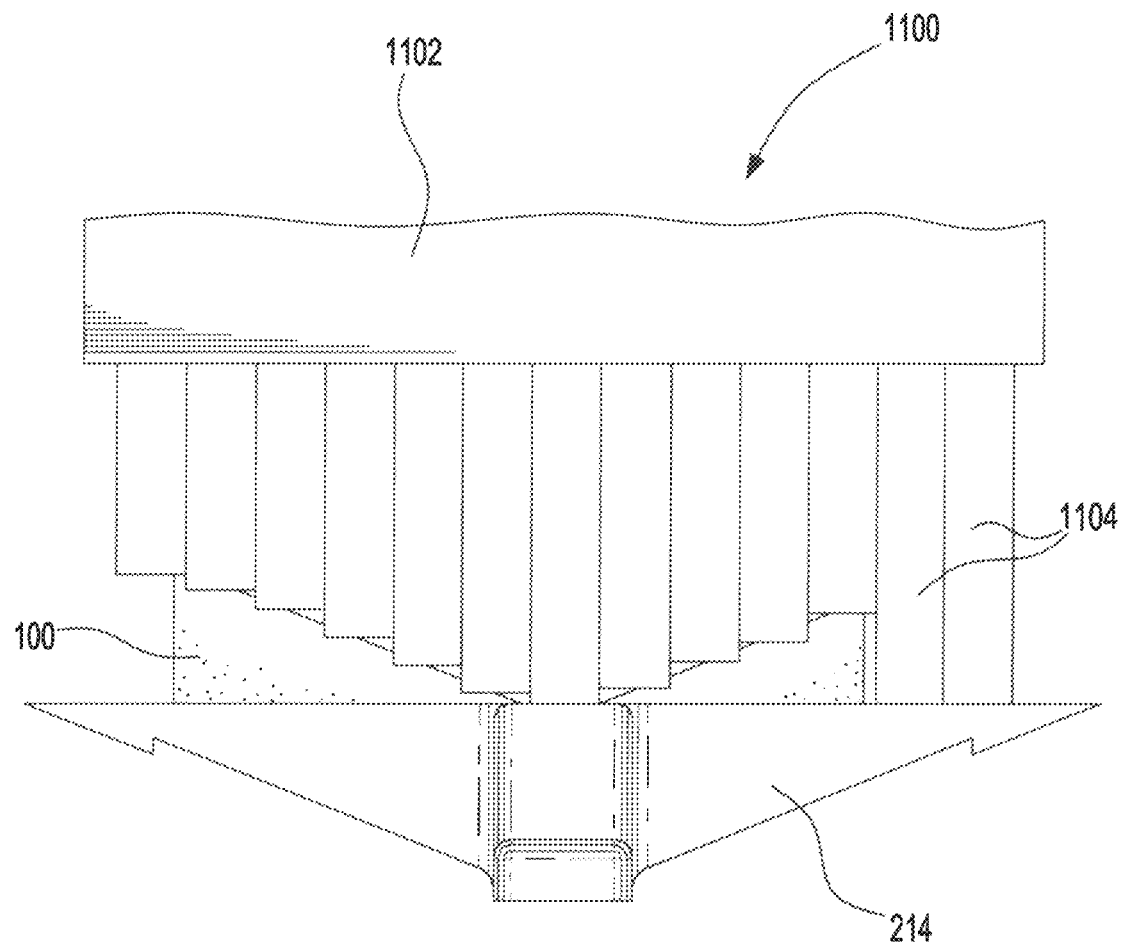
FIG. 11 is a schematic representation of a side elevation view of an embodiment of a shell opener having a hammer supplied with individually moveable percussion elements.

In accordance with a first embodiment shown in FIG. 11, the shell opener comprises a hammer 1100 having a base 1102 and adjacent, rigid percussion elements 1104 mechanically mounted thereon by springs. The length of the elements 1104 is adjustable automatically due to the springs to follow the general form of the topside shell surface of the body part 100 disposed within the support element 214. As a result, the shell opener exerts pressure on multiple points across the body part, which increases the effectiveness with which it opens the shell along the line of weakness previously imparted by the laser unit.

Figure 12:
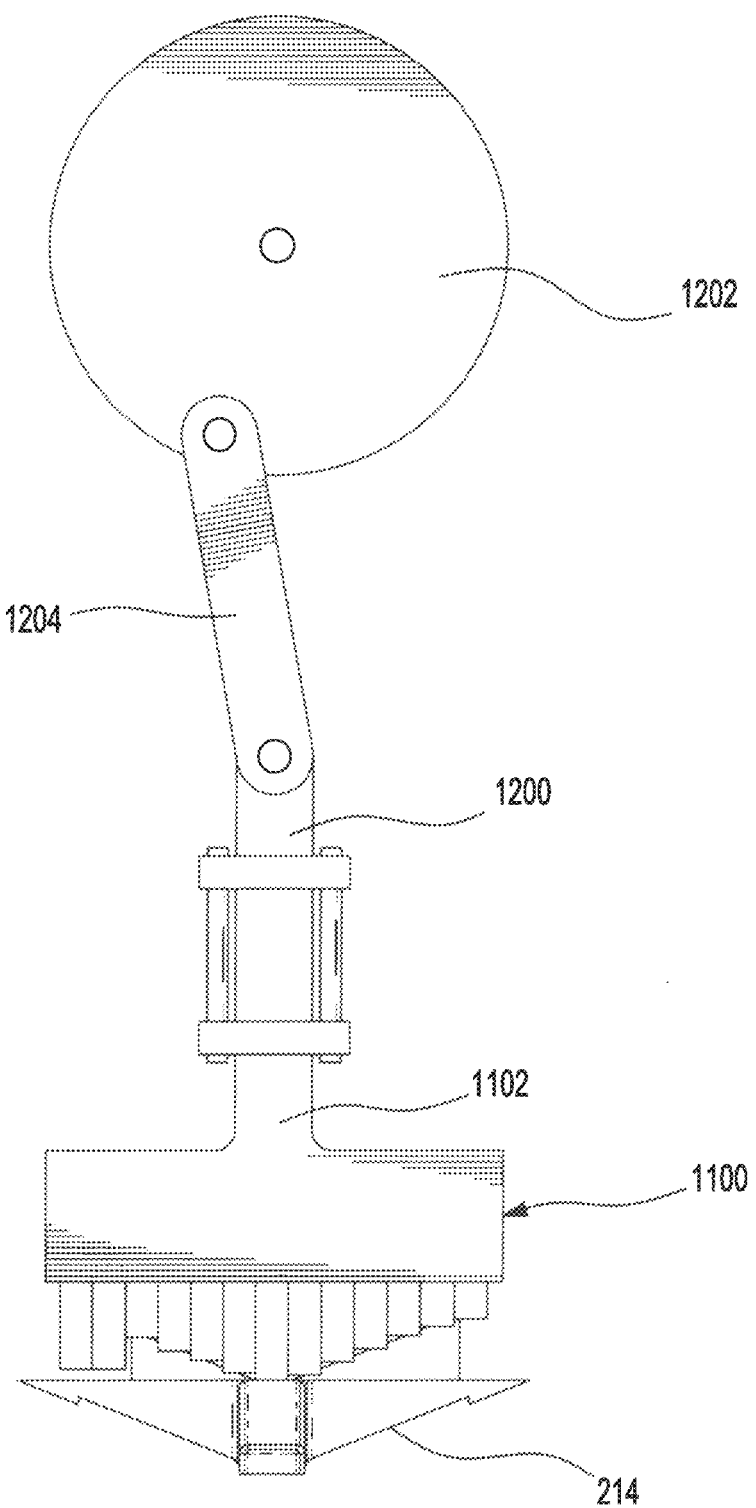
FIG. 12 is a schematic representation of a side elevation view of a crank mechanism used to drive the shell opener shown in FIG. 11 according to an embodiment of the invention.
Figure 13:
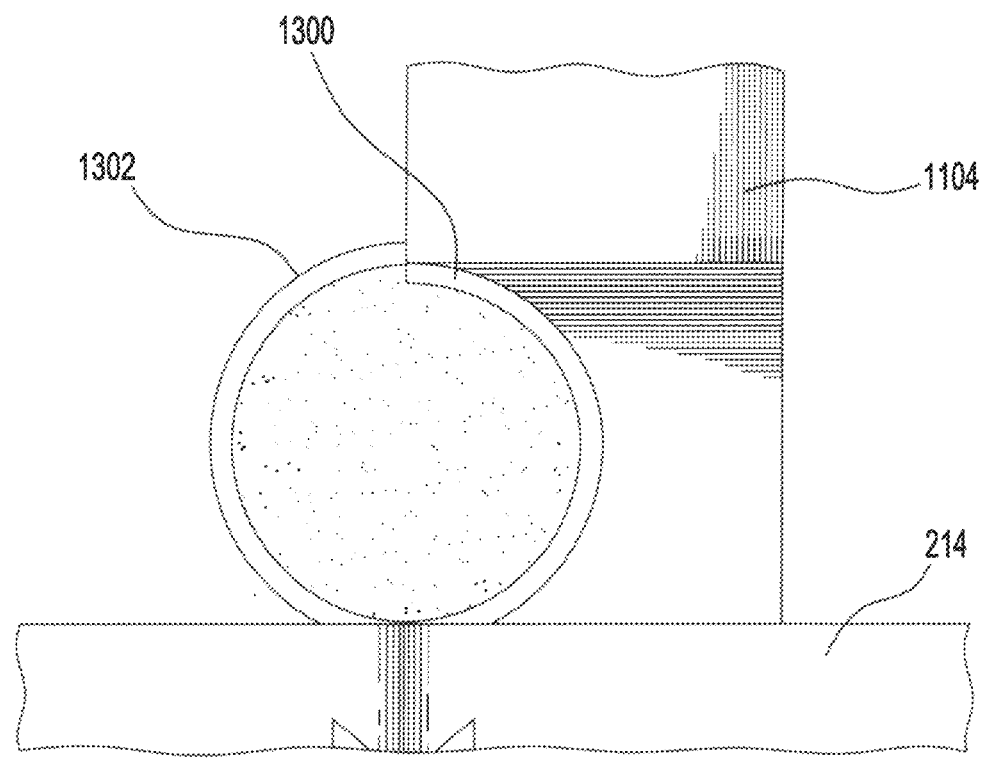
FIG. 13 is a schematic representation of a front elevation view of the shell opener shown in FIG. 11, the base being offset with respect to a support element in which is disposed a body part shown in cross section.

As shown in FIG. 12, the shell opener can have a crank 1202 and a connecting rod 1204 configured to drive the movement of the hammer 1100 by exerting pressure on the base 1102 through an operative end 1200. The operation of the connecting rod 1204 and transportation module 216 can be synchronized to ensure that the hammer 1100 is aligned with the centre of each one of the support element 214 along a vertical plane when pushed into impact with the body part 100. According to an embodiment shown in FIG. 13, the base 1102 can be offset with respect to the width of the support element 214 so that when the percussion elements 1104 are brought into impact with the body part 100, their extremities fall on one side of the line of weakness to further separate shell portions 1300 and 1302 from one another.

Figure 14:
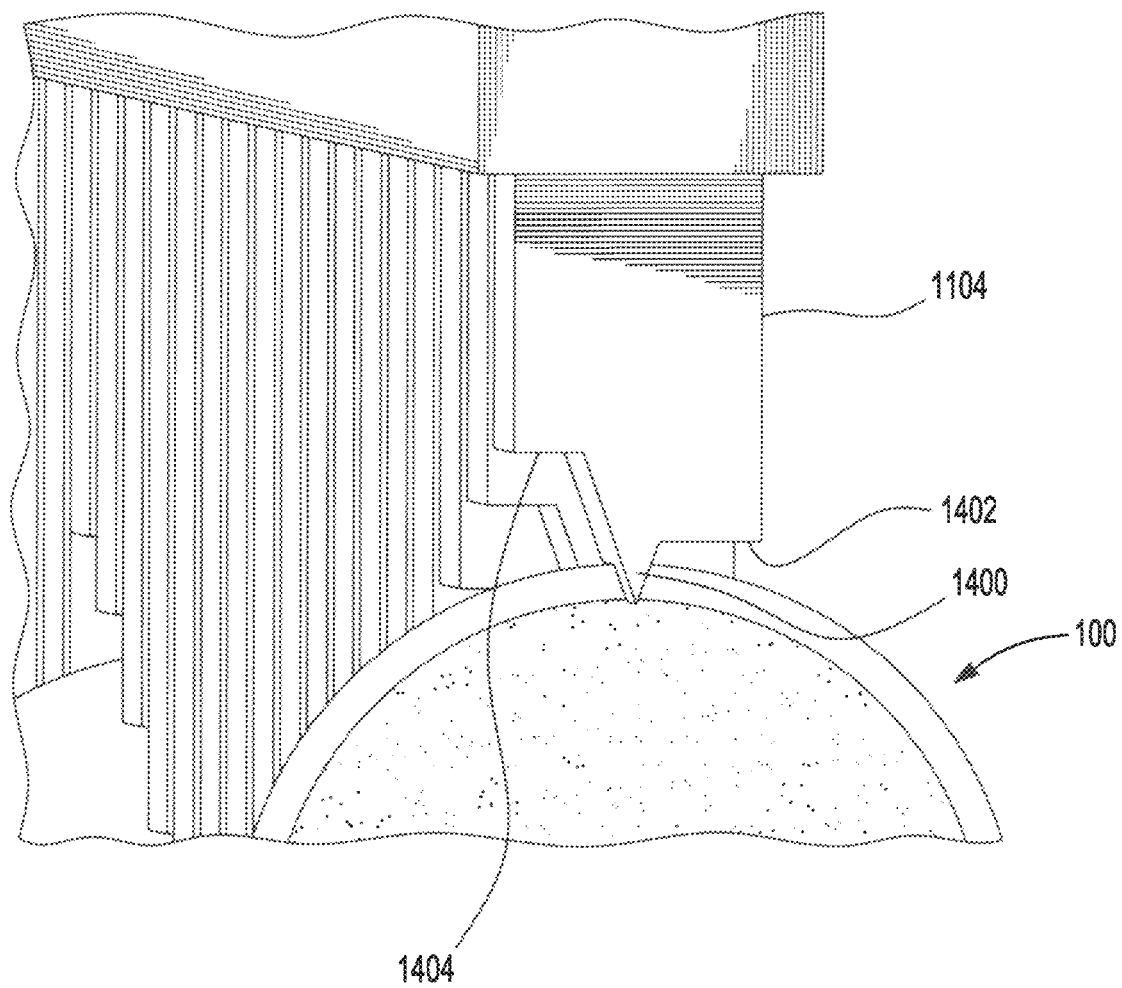
FIG. 14 is a schematic representation of a detailed view of an embodiment of the shell opener having a hammer supplied with individually moveable percussion elements, each of which forms a tooth.
Figure 15:
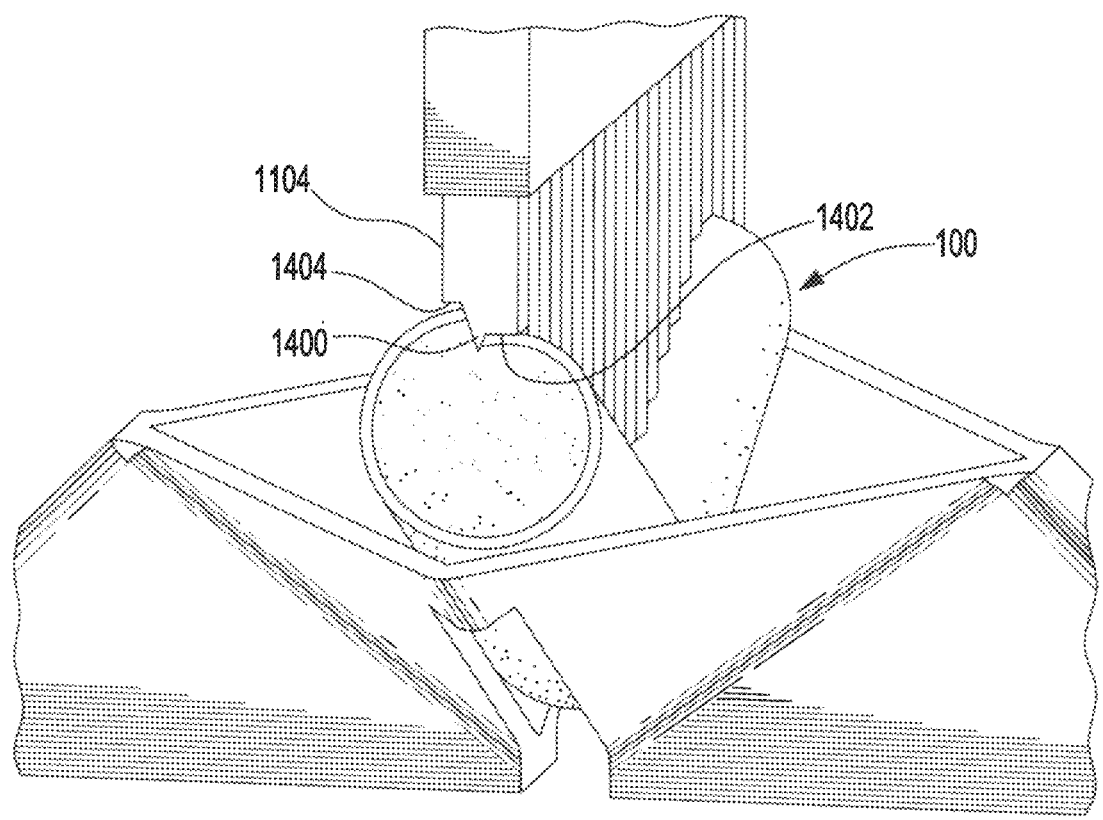
FIG. 15 is a schematic representation of a front elevation view of the shell opener embodiment shown in FIG. 14, the front elevation view illustrating the shell opener as following the topography of a body part as it exerts pressure thereon.

In one embodiment shown in FIG. 14, the extremity of each one of the percussion elements 1104 forms a tooth 1400 insertable through the shell 102 on impact in order to weaken the internal membrane that covers the meat 108. In one embodiment, the tooth 1400 is positioned between two shoulders 1402 and 1404 spaced from one another so as to facilitate the opening of the shell 102 as shown in FIG. 15.

Figure 16:
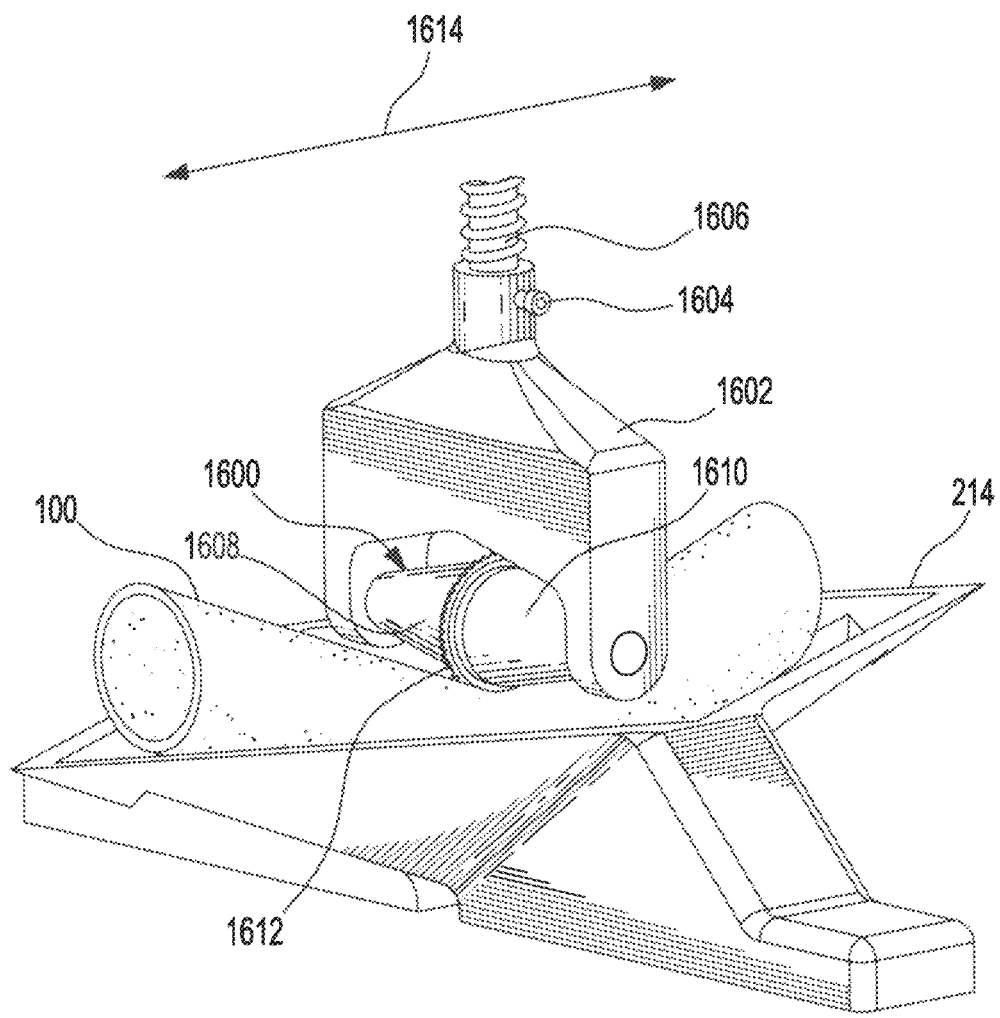
FIG. 16 is a schematic representation of a side elevation view of another embodiment of the shell opener having a roller.
Figure 17:
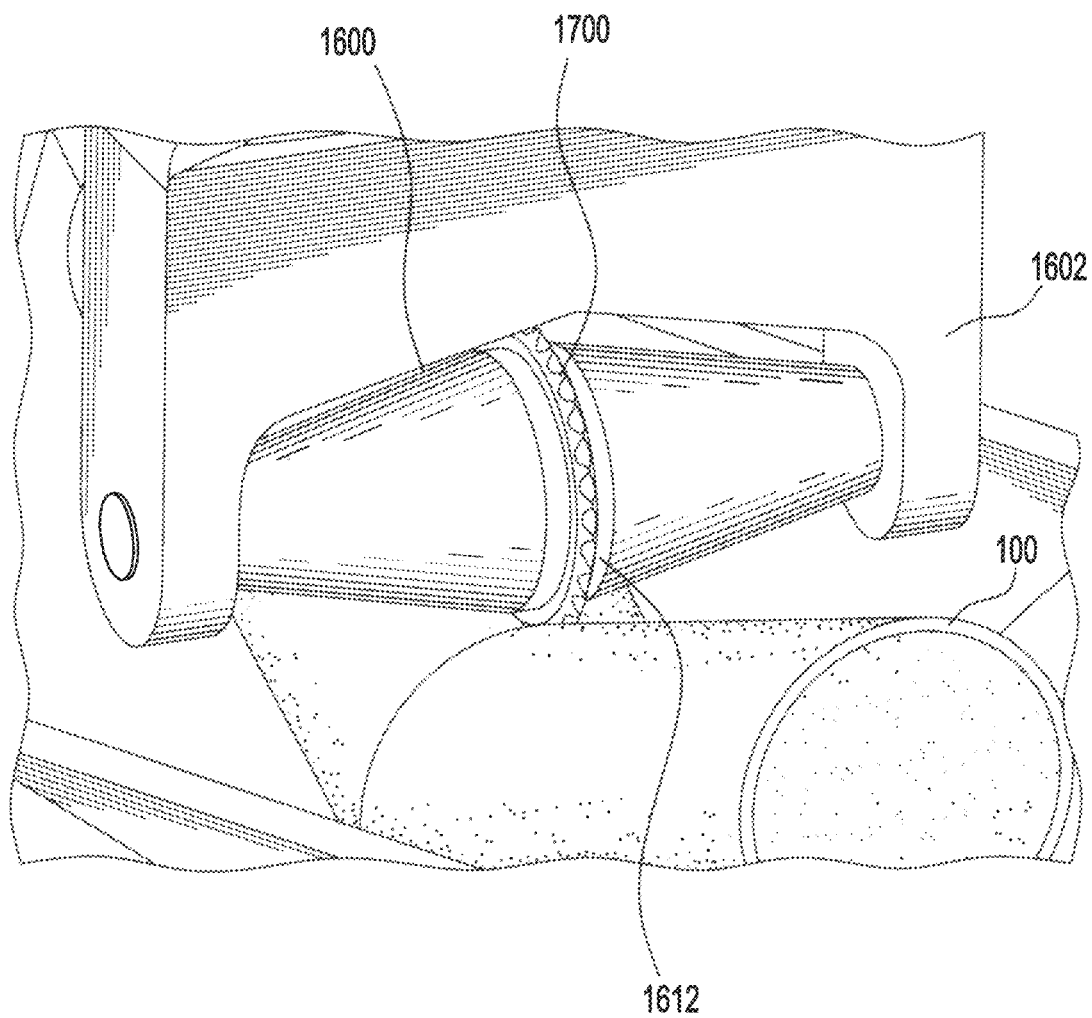
FIG. 17 is a schematic representation of a detailed view of the shell opener embodiment shown in FIG. 16, the detailed view showing the teeth of a central ring of the roller.

In another embodiment shown in FIG. 16, the shell opener has a roller 1600 mounted on a frame 1602 to enable its rotation around its longitudinal axis. The roller 1600 comprises two conical components 1608 and 1610, the bases of which are coupled to one another by a central ring 1612 so as to give the roller the shape taken by the topside surface of the body part 100. The shape of the roller 1600 provides for the continuous crushing of the topside surface of the body part 100. The superior portion of the frame 1602 is adapted to receive one of the extremities of a threaded rod 1606, the other extremity being connected to a linear actuator that operates along vertical and horizontal axes to enable the reciprocal displacement of the frame 1602 along a straight path 1614 parallel to the longitudinal axis of the support element 214. The frame 1602 can be rotated with respect to the threaded rod 1606 until the rotation axis of the roller 1600 is parallel to the transversal axis of the support element 214 and a clamping bolt 1604 can be operated to secure the position. As can be clearly seen in FIG. 17, the central ring 1612 is provided with teeth 1700 insertable through the line of weakness as the roller 1600 is applied against the shell 102 under the vertical and horizontal forces exerted on frame 1602, thereby weakening the internal membrane covering the meat 108 to increase the effectiveness with which the shell 102 is opened.

Figure 18:
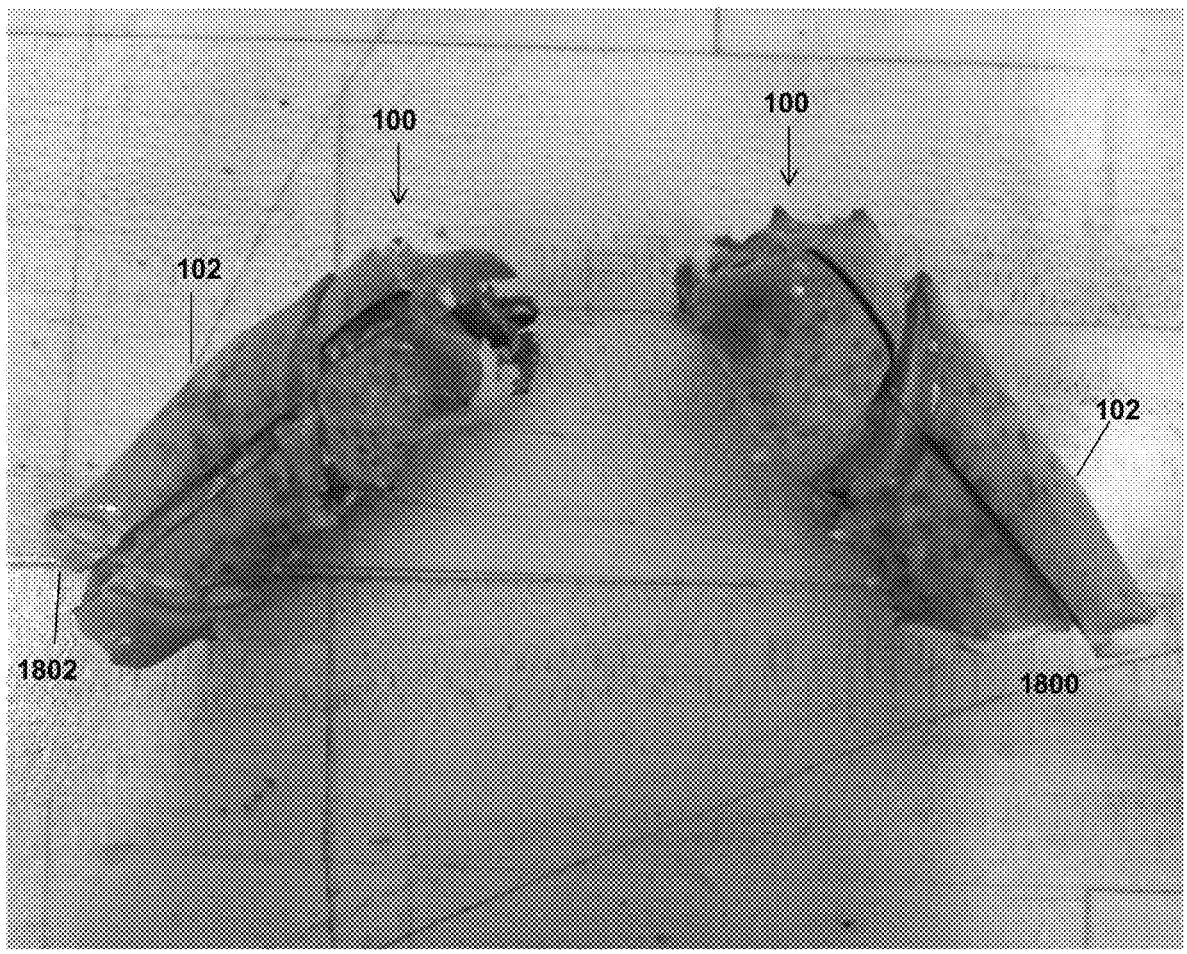
FIG. 18 is a photograph showing in juxtaposition a lobster arm whose shell has been cut and another whose shell has been cut and opened.

The benefit of deploying the shell opener within the preparation system 218 can be clearly ascertained from FIG. 18. The presented photograph juxtaposes two body parts 100, the first of which is a lobster arm that was been processed by a laser unit having a laser source operatively coupled to a two-dimensional beam-steering device. The second is another lobster arm that has was processed by the same laser unit and by the shell opener. Upon close inspection of the photograph, a cut 1802 extending across the second one of the body parts 100 is significantly wider than a cut 1800 extending across the first one, thereby providing greater access to the meat 108 for extraction.

According to an embodiment of the present invention, there is provided a computer readable medium having stored thereon a computer program to be executed on a programmable processor. The computer-readable medium can be any computer program product, apparatus, or device such as magnetic discs, optical disks, memory, and programmable logic devices used to provide machine instructions or data to a programmable processor. The computer program can be any set of machine instructions for a programmable processor and can be implemented in a high-level procedural language, in an objected-oriented language, in assembly or machine language, and in any combination thereof.

The computer readable medium has stored thereon a server program to be executed on a local server located in the same area as the facility 200 or on a remote server. The server can be stationary or portable. It can be a ready-made device or one that is specifically designed to execute the server program. The server program, when executed, enables the server as the system controller described in preceding paragraphs, one that communicates with other components of the preparation system 218 for the purpose of forming a line of weakness within the shell, the line of weakness being dimensioned to facilitate meat extraction, and for the purpose of opening the shell along the line of weakness to expose the meat for extraction.

Figure 20:
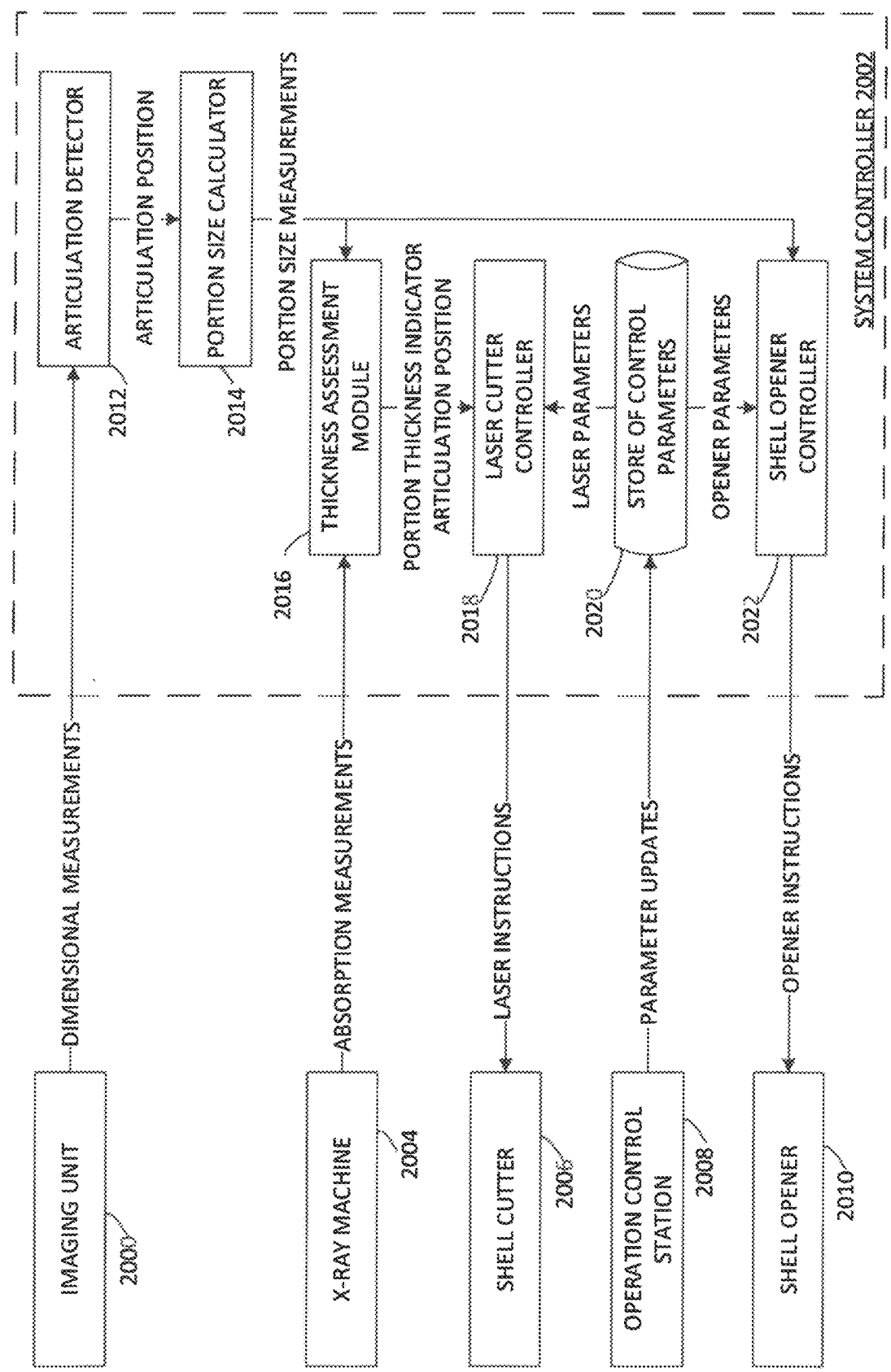
FIG. 20 is a schematic block diagram of a system for preparing shelled crustacean body parts for meat extraction.

FIG. 20, provides a schematic block diagram of a system controller 2002 according to an embodiment of the present invention. The system controller 2002 is in communication: with an imaging unit 2000 to access dimensional measurements pertaining to the body part for the purpose of generating tailored instructions to other components of the preparation system 218; with a laser unit 2006 to provide instructions for forming a line of weakness within the shell taking into account the thickness of the shell; with a shell opener 2010 to provide instructions for opening the shell taking into account the size of the body part; and with an operation control station 2008 for the purpose of enabling an operator to perform updates. The following is a description of the various components of the system controller 2002 and the manner in which they cooperate with one another to prepare the body part for meat extraction. It will be appreciated that the system controller 2002 can, in another embodiment, incorporate a different combination of components configured to fulfill the same purpose.

The system controller 2002 has an articulation detector 2012 configured to process dimensional measurements of the body part generated by the imaging unit 2000 to locate the articulations; a portion evaluator 2014 configured to process the dimensional measurements as a function of the locations of the articulations to evaluate the size and location of each portion of the body part, each portion being joined with another by at least one of the located articulations; a thickness evaluator 2016 configured to evaluate the thickness of the shell across the portions; a laser unit controller 2018 configured to determine laser parameters for the laser unit 2006 from the locations of the portions, the thickness evaluation, and information available in a store of control parameters 2020; a shell opener controller 2022 configured to generate instructions for a shell opener 2010 from the size and location of the portions and information stored in the store of control parameters 2020; and the store of control parameters 2020 in which are stored a laser beam power, a number of laser beam sweeps, and a speed at which the laser beams are to be swept for each thickness evaluation, as well as a crushing pressure for each portion size.

The articulation detector 2012 is a combination of one or more computer programs and electronic circuits configured to detect the position of any articulation of the body part. It is in wired or wireless communication with the imaging unit 2000 and the portion evaluator 2014. Upon receiving the dimensional measurements of the body part 100 as captured by the imaging unit 2000, it processes these measurements to detect any variation in topography indicative of an articulation, processes any detected variation to determine the location of a corresponding articulation, and provides the location in question to the portion evaluator 2014.

The portion evaluator 2014 is a combination of one or more computer programs and electronic circuits configured to determine the size and location of individual portions of the body part. It is in wired or wireless communication with the imaging unit 2000, the articulation detector 2012, the thickness evaluator 2016, the laser unit controller 2018, and the shell opener controller 2022. Upon receiving the dimensional measurements captured by the imaging unit 2000 and the articulation locations determined by the articulation locator 2012, the portion evaluator 2014 processes the dimensional measurements as a function of the articulation locations to determine the individual location of each portion, processes the dimensional measurements as a function of the portion locations to evaluate the individual size of each portion, and provides the individual location and size evaluation to the thickness evaluator 2016, the laser unit controller 2018, and the shell opener controller 2022.

The thickness of a shell extending across a body part of a certain type belonging to a particular crustacean species can be assessed from the size of the body part in question. Similarly, the thickness of a shell extending across a portion of a body part of a certain type belonging to a particular crustacean species can be assessed from the size of the portion. It will be appreciated that the size of a body part or a portion thereof can be evaluated with reference to its length, width, surface, volume, or any combination thereof for the purposes of evaluating shell thickness. For instance, in one embodiment, the size of a portion refers to its greatest cross-sectional diameter. In another embodiment, the size of a portion refers to a combination of its greatest length and width. It will also be appreciated that the size evaluation can be qualitative or quantitative. For instance, in one embodiment, the portion evaluator 2014 ranks the portions of the body part 100 by size and assigns to each portion a portion size value in the form of a ranking indicator. In another embodiment, each portion size value can be a qualifier selected from small, medium, and large. In yet another embodiment, each portion size value is a numerical estimation expressed in standard units of length, surface, or volume, which estimation can be generated using, for instance, a neural network specifically trained for this purpose. It will be appreciated that other types of portion size values can be used for the purposes of assessing shell thickness.

The thickness evaluator 2016 is a combination of one or more computer programs and electronic circuits configured to evaluate shell thickness across the different portions of the body part. It is in wired or wireless communication with the portion evaluator 2014 and the laser unit controller 2018. Upon receiving the individual location and portion size values of each portion, the thickness evaluator 2014 evaluates the thickness of the shell for each portion of the body part from the corresponding portion size value and assigns to each portion a thickness value, which can be qualitative or quantitative. For instance, in one embodiment, the preparation system controller 2002 is calibrated to process lobster arms, each of which consists in two portions separated by an articulation, the thickness value is a qualifier selected from "thin" and "thick", and the thickness evaluator 2016 is configured to: identify one of the portions as having a greater size from the size measurements; assign the thickness value "thick" to the identified portion; and assign the thickness value "thin" to the other portion. In another embodiment, the thickness value is a numerical estimation expressed in standard units of length.

The store of control parameters 2020 can be any combination of one or more computer programs and electronic circuits configured to store data. It can be a relational database, a non-relational database, or any other type of structured and persistent memory that enables computer programs to query and edit its content. For instance, it can be a Microsoft® SQL server database. The content of the store of control parameters 2020 comprises for each type of body part of each crustacean species that can be handled by the preparation system 218: laser parameters; pressure parameters; and an indication as to whether the laser parameters and pressure parameters are accessible to the laser unit controller 2018 and the shell opener controller 2022.

Examples of laser parameters include a laser beam power, a number of laser beam sweeps, and a speed at which the laser beam is to be swept for each thickness value. In one embodiment, the laser parameters comprise a speed at which the laser beam is to be swept for each thickness value, the speed being lower for thicker shells and higher for thinner shells. In another embodiment, the laser parameters comprise a number of laser beam sweeps and a speed at which the laser beam is to be swept for each thickness value. Examples of pressure parameters include a pressure magnitude and a pressure duration for each size of the body part. In one embodiment, the pressure magnitude and duration being greater for larger body parts.

The content of the store of control parameters 2020 can be updated by an operator through an operation control station 2008. Updates can be performed to add, remove, or edit data so as to expand, reduce, or improve the capabilities of the preparation system 218. For instance, an operator can add control parameters to accommodate a new type of body part belonging to a new species of crustaceans. An operator can also set the access parameters for the purposes of restricting the access of the laser unit controller 2018 and the shell opener controller 2022 to data relevant to the particular types of body parts belonging to the particular species of crustaceans that are being processed by the preparation system 218.

The laser unit controller 2018 is a combination of one or more computer programs and electronic circuits configured to determine laser parameters for the laser unit 2006. It is in wired or wireless communication with the portion evaluator 2014 and the laser unit 2006. The laser unit controller 2018: retrieves from the store of control parameters 2020 the laser parameters associated with each one of the thickness values assigned by the thickness evaluator 2016; processes the dimensional measurements of the body part in accordance with the locations of the portions of the body part determined by the portion evaluator 2014 to define a laser path for each one of the portions; and provides the laser unit 2006 with instructions to form a line of weakness within the shell in accordance with the portion-specific laser parameters and laser path. In another embodiment, instead of defining a laser path for each one of the portions of the body part, the laser unit controller 2018 defines a single laser path for the body part from the dimensional measurements.

The shell opener controller 2022 is a combination of one or more computer programs and electronic circuits configured to select parameters for the laser unit 2006. It is in wired or wireless communication with the portion evaluator 2014 and the laser unit 2006. The shell opener controller 2022: evaluates the size of the body part from the portion size values of its portions; retrieves from the store of control parameters 2020 the pressure parameters associated with the size evaluation of the body part; processes the dimensional measurements of the body part to define a pressure path; and provides the shell opener 2010 with instructions to exert pressure onto the body part in accordance with the retrieved pressure parameters along the pressure path. In another embodiment, the shell controller 2014 evaluates the size of the body part directly from the dimensional measurements captured by the imaging unit 2000.

An exemplary operation of the preparation system 218 in preparing crustacean body parts for meat extraction is described in the following with reference to FIG. 1, FIG. 2, FIG. 20, and FIG. 23, the latter presenting a flowchart of the operation. In a step 2300, the imaging unit 2000 generates three-dimensional profile images of the body parts 100 disposed on the support trays 214 mounted on the transportation module 216, each one of the profile images consisting in a sequence of dimensional measurements. The four following steps are performed to evaluate the thickness of the shell extending across the body part from the dimensional measurements.

In a step 2300, the articulation detector 2012 of the system controller 2002 processes the dimensional measurements to detect any variation in topography indicative of an articulation, and processes any detected variation to determine the location of a corresponding articulation. It will be appreciated that one or more articulations can be detected within a same one of the body parts.

In a step 2304, the portion evaluator 2014 processes the dimensional measurements generated by the imaging unit 2000 as a function of the articulation locations determined by the articulation detector 2012 to determine the individual location of each portion of the body part, consecutive portions of the body part being joined by the detected articulations. For instance, the body parts can be lobster arms, each of which consists in two portions connected to one another by an articulation.

In a step 2306, the portion evaluator 2012 processes the dimensional measurements as a function of the portion locations determined in the previous step to evaluate the individual size of each portion. The size of each portion can be evaluated with reference to its length, width, surface, volume, or any combination thereof to generate a portion size value indicative of shell thickness. For instance, in one embodiment, the portion size value refers to its greatest cross-sectional diameter. In another embodiment, the portion size value refers to a combination of its greatest length and width. The portion size value can be qualitative or quantitative. For instance, in one embodiment, the portion evaluator 2014 ranks the portions of the body part by size and each portion size value is a ranking indicator. In another embodiment, each portion size value can be a qualifier selected from "small", "medium", and "large". In yet another embodiment, each portion size value is numerical estimation expressed in standard units of length, surface, or volume. It will be appreciated that other types of portion size value can be used for the purposes of assessing shell thickness.

In a step 2308, the thickness evaluator 2016 evaluates the thickness of the shell for each portion of the body part from the portion size values generated in the previous step and assigns to each portion a thickness value that can be qualitative or quantitative. For instance, in one embodiment, the preparation system controller 2002 is calibrated to process lobster arms, each of which consists in two portions separated by an articulation, the thickness value is a qualifier selected from "thin" and "thick", and the thickness evaluator 2016 is configured to: identify one of the portions as having a greater size from the size measurements; assign the thickness value "thick" to the identified portion; and assign the thickness value "thin" to the other portion. In another embodiment, the thickness value is a numerical estimation expressed in standard units of length.

In a step 2310, the laser unit controller 2018 retrieves from the store of control parameters 2020 the laser parameters associated with each one of the thickness values generated in the previous step, processes the dimensional measurements of the body part in accordance with the locations of the portions of the body part determined by the portion evaluator 2014 to define a laser path for each one of the body portions; and provides the laser unit 2006 with instructions to form a line of weakness in accordance with the portion-specific laser parameters and laser path. In another embodiment, instead of defining a laser path for each one of the portions of the body part, the laser unit controller 2018 defines a single laser path for the body part from the dimensional measurements.

In a step 2312, the laser unit 2006 forms a line of weakness within the shell in accordance with the portion-specific laser parameters and laser path to expose the meat for extraction. In one embodiment, the laser unit 2006 forms the lines of weakness on one side of the body part. In another embodiment, the laser unit 2006 forms the line of weakness on two opposite sides of the body part.

In a step 2314, the shell opener controller 2020 evaluates the size of the body part from the portion size values of its portions, retrieves from the store of control parameters 2018 the pressure parameters associated with the size evaluation of the body part, processes the dimensional measurements of the body part 100 to define a pressure path, and provides the shell opener 2008 with instructions to exert pressure onto the body part 100 in accordance with the retrieved pressure parameters along the pressure path. In another embodiment, the shell controller 2018 evaluates the size of the body part directly from the dimensional measurements captured by the imaging unit 2000.

In a step 2316, the shell opener 2008 of the shell opening station 224 exerts pressure onto the body part in accordance with the pressure parameters retrieved in the previous step along the pressure path defined in the previous step to open the shell along the line of weakness formed in the step 2314 so as to further expose the meat for extraction. The meat residing in the body part can be extracted downstream from the shell opening station 226 in a manual or automated manner through the open shell. While the method of the present invention has been described as involving the step 2314, this steps is optional. For instance, in one embodiment, the step 2312 is immediately followed by the step 2316, and the latter step is performed manually by workers.

Figure 22:
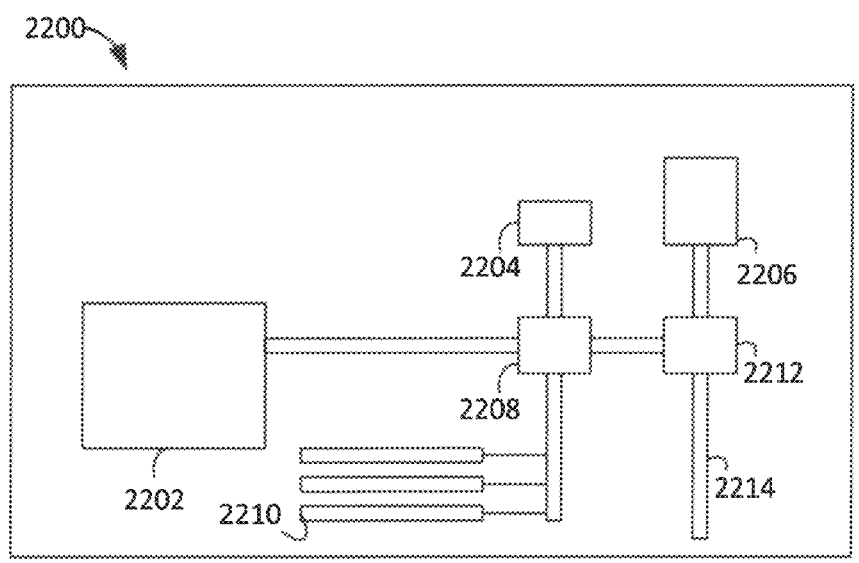
FIG. 22 is a schematic block diagram of the hardware of a controller.
Figure 23:
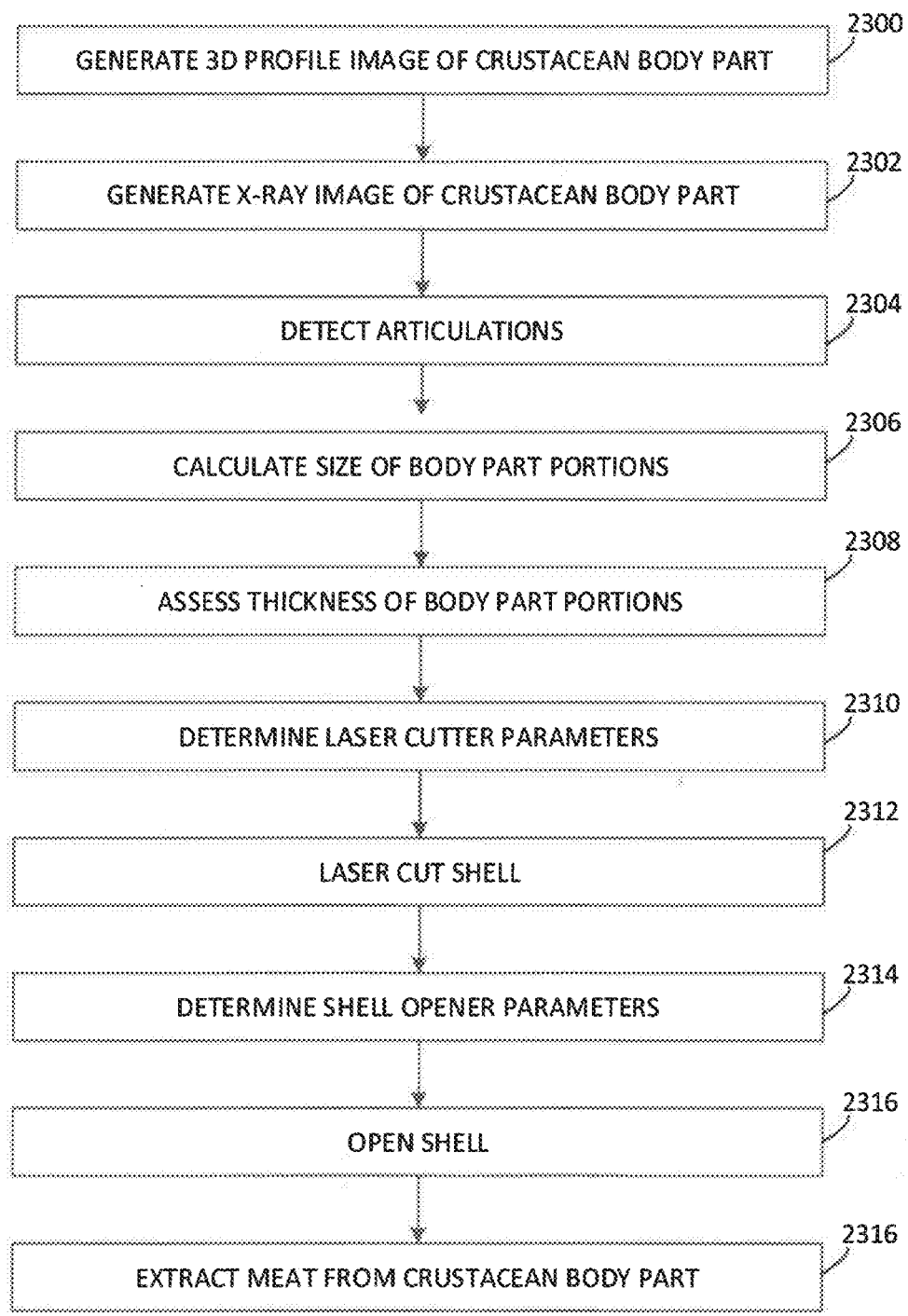
FIG. 23 is a flowchart illustrating an embodiment of the method of preparing a shelled crustacean body part for meat extraction.

FIG. 22 shows an example of a server 2200, which may be used to implement the processes of the system controller 2002 described herein. The server 2200 is intended to represent various forms of controllers. The components shown here, their connections, their relationships, and their functions, are meant to be exemplary only, and are not meant to limit implementations of the present invention.

The server 2200 has a processor 2202, memory 2204, a storage device 2206, a high-speed interface 2208, high-speed expansion ports 2210, a low speed interface 2212, and a low speed bus 2214 interconnected using various busses and mounted on a common motherboard. The processor 2202 can process instructions for execution within the system controller 2200, including instructions stored in the memory 2204 or on the storage device 2206 to display graphical information for a GUI on an external input/output device, such as a display coupled to the high-speed interface 2208. In other implementations, multiple processors and multiple busses may be used as appropriate, along with multiple memories of different types. In some embodiments, the server 2200 is located in a cloud platform such as Microsoft Azure™.

The memory 2204 can be volatile or non-volatile. The storage device 2206 is capable of providing mass storage for the system controller 2200. In one implementation, the storage device 2206 may be or contain a computer-readable medium, such as a floppy disk device, a hard disk device, an optical disk device, or a tape device, a flash memory or other similar solid state memory device, or an array of devices, including devices in a storage area network. A computer program can be tangibly embodied in an information carrier and contain instructions which, when executed, perform one or more methods, such as those described above. The information carrier may be a non-transitory computer-readable or machine-readable storage medium, such as the memory 2204, the storage device 2206, or memory in the processor 2202.

The high-speed controller 2208 manages bandwidth-intensive operations for the system controller 2200, while the low-speed controller 2212 manages lower bandwidth-intensive operations. In one implementation, the high-speed controller 2208 is coupled to the memory 2204, to the display through, for instance, a graphics processor or accelerator, and to the high-speed expansion ports 2210, which may accept various expansion cards. The low-speed controller 2212 is coupled to the storage device 2206 and low speed bus 2214. The low-speed controller 2212, which may include various communication ports such as ones configured for USB, Bluetooth™, Ethernet, and wireless Ethernet communications, may be coupled to one or more input/output devices, such as a keyboard, a pointing device, a scanner, and a networking device such as a switch or router through a network adapter.

The invention claimed is:

1. A method of preparing a shelled crustacean body part for meat extraction, said method comprising the steps of: capturing an image of said body part; evaluating the thickness of the shell from said image; determining from said thickness evaluation at least one laser parameter for forming a line of weakness within said shell, said line of weakness being dimensioned to facilitate meat extraction, while preserving sensory characteristics of the meat; and sweeping a laser beam on said body part in accordance with said laser parameter to form said line of weakness within said shell in order to facilitate meat extraction.

2. The method of claim 1, wherein said image is a three-dimensional profile image of said body part.

3. The method of claim 1, wherein said line of weakness is a shell-deep cut.

4. The method of claim 1, wherein said laser parameter is selected from the group consisting of: the number of times said laser beam is to be swept; the speed at which said laser beam is to be swept; and the intensity of said laser beam.

5. The method of claim 1, further comprising the step of determining from said image a laser path along which said laser beam is to be swept, wherein the step of sweeping a laser beam is performed along said laser path.

6. The method of claim 1, further comprising the step of locating an articulation of said body part from said image, and wherein the steps of evaluating the thickness of said shell, determining from said thickness evaluation at least one laser parameter, and sweeping a laser beam are performed separately for each one of the portions of said body part joined by said articulation.

7. The method of claim 1, wherein the step of sweeping a laser beam is performed on opposite sides of said body part so as to form two of said line of weakness within said shell.

8. The method of claim 1, further comprising the step of exerting pressure on said body part to open said shell along said line of weakness.

9. The method of claim 8, further comprising the steps of evaluating the size of said body part and determining a pressure magnitude as a function of said size evaluation, wherein the step of exerting pressure is performed in accordance with said pressure magnitude.

10. The method of claim 1, further comprising the step of blowing air onto said body part to blow away shell fragments formed during the step of sweeping a laser beam.

11. The method of claim 1, wherein said laser beam is pulsed.

12. A computer readable medium having stored thereon a software application to be executed by a controller of a system for preparing a shelled crustacean body part for meat extraction, said controller having a processor, said body part being carried along a displacement path by a transportation module, said software application, when executed by said controller, causes said controller's processor to perform the steps of: evaluating the thickness of the shell from an image of said body part; determining from said thickness evaluation at least one laser parameter for forming a line of weakness within said shell, said line of weakness being dimensioned to facilitate meat extraction, while preserving sensory characteristics of the meat; and providing instructions to at least one of said system and said transportation module to sweep a laser beam on said body part in accordance with said laser parameter to form said line of weakness within said shell in order to facilitate meat extraction.

13. The computer readable medium of claim 12, wherein said image is a three-dimensional profile image.

14. The computer readable medium of claim 12, wherein said line of weakness is a shell-deep cut.

15. The computer readable medium of claim 12, wherein said instructions are provided to said system, and said laser parameter is selected from the group consisting of: the number of times said laser beam is to be swept; the speed at which said laser beam is to be swept; and the intensity of said laser beam.

16. The computer readable medium of claim 12, wherein said processor is further caused to perform the step of determining from said image a laser path along which said laser beam is to be swept, and said instructions are for causing the sweep of said laser beam along said laser path.

17. The computer readable medium of claim 12, wherein said processor is further caused to perform the step of locating an articulation of said body part from said image, and the steps of evaluating the thickness of said shell, determining from said thickness evaluation at least one laser parameter, and providing said instructions are performed separately for each one of the portions of said body part joined by said articulation.

18. The computer readable medium of claim 12, wherein said instructions are for causing the sweep of said laser beam on opposite sides of said body part so as to form two of said line of weakness within said shell.

19. The computer readable medium of claim 12, wherein said processor is further caused to perform the steps of evaluating the size of said body part, determining as a function of said size evaluation the magnitude of a pressure to be exerted onto said body part to open said shell along said line of weakness, and providing said system with further instructions to exert said pressure of said magnitude on said body part.

20. A system for preparing a shelled crustacean body part for meat extraction, said body part being carried along a displacement path by a transportation module, said system comprising: an imaging unit configured to capture an image of said body part; a laser unit configured to project a laser beam on said body part downstream from said imaging unit; and a processor programmed to perform the steps of: evaluating the thickness of the shell from said image; determining from said thickness evaluation at least one laser parameter for forming a line of weakness within said shell, said line of weakness being dimensioned to facilitate meat extraction, while preserving sensory characteristics of the meat; and
 providing instructions to at least one of said laser unit and said transportation module to sweep said laser beam on said body part in accordance with said laser parameter to form said line of weakness within said shell in order to facilitate meat extraction.

21. The system of claim 20, wherein said imaging unit is a three-dimensional scanner and said image is a three-dimensional profile image.

22. The system of claim 20, wherein said line of weakness is a shell-deep cut.

23. The system of claim 20, wherein said instructions are provided to said laser unit and said laser parameter is selected from the group consisting of: the number of times said laser beam is to be swept; the speed at which said laser beam is to be swept; and the intensity of said laser beam.

24. The system of claim 20, wherein said processor is programmed to further perform the step of determining from said image of said body part a laser path along which said laser beam is to be swept and said instructions are for causing the sweep of said laser beam along said laser path.

25. The system of claim 20, wherein said processor is programmed to: further perform the step of locating an articulation of said body part from said image; and to perform the steps of evaluating the thickness of said shell, determining from said thickness evaluation at least one laser parameter, and providing instructions separately for each one of the portions of said body part joined by said articulation.

26. The system of claim 20, wherein said instructions are for causing the sweep of said laser beam on opposite sides of said body part so as to form two of said line of weakness within said shell.

27. The system of claim 20, further comprising an air blower configured to blow away shell fragments formed while said laser beam is swept on said body part.

28. The system of claim 20, further comprising a shell opener configured to exert pressure on said body part in order to open said shell along said weakness line.

29. The system of claim 28, wherein said processor is configured for communication with said shell opener, said processor being programmed to further perform the steps of evaluating the size of said body part from said image, determining a pressure magnitude as a function of said size evaluation, and providing said shell opener with instructions to exert said pressure of said magnitude on said body part.

30. The system of claim 29, wherein said shell opener comprises a set of percussion elements that are independently moveable to follow the topography of said body part as they exert pressure on distinct points of impact.

31. The system of claim 20, wherein said laser beam is pulsed.

32. The system of claim 20, further comprising a support element mountable on said transportation module for receiving said body part upstream from said imaging unit, said support element defining a crossed V-shape for aligning said body part in a position for processing by said imaging unit and said laser unit.

* * * * *